(12) United States Patent
Atwell et al.

(10) Patent No.: US 9,267,784 B2
(45) Date of Patent: Feb. 23, 2016

(54) LASER LINE PROBE HAVING IMPROVED HIGH DYNAMIC RANGE

(71) Applicant: FARO Technologies, Inc., Lake Mary, FL (US)

(72) Inventors: Paul C. Atwell, Lake Mary, FL (US); Keith G. Macfarlane, Lake Mary, FL (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 33 days.

(21) Appl. No.: 14/328,846

(22) Filed: Jul. 11, 2014

(65) Prior Publication Data

US 2015/0015898 A1 Jan. 15, 2015

Related U.S. Application Data

(60) Provisional application No. 61/860,353, filed on Jul. 31, 2013, provisional application No. 61/846,363, filed on Jul. 15, 2013.

(51) Int. Cl.
| | |
|---|---|
| *G01B 11/00* | (2006.01) |
| *G01B 11/24* | (2006.01) |
| *G01B 11/25* | (2006.01) |
| *G01B 5/008* | (2006.01) |

(52) U.S. Cl.
CPC .............. *G01B 11/005* (2013.01); *G01B 5/008* (2013.01); *G01B 11/25* (2013.01)

(58) Field of Classification Search
USPC .................. 356/614–636, 3.03, 3.07; 348/46; 382/106, 128, 154; 455/556.1
See application file for complete search history.

(56) References Cited

U.S. PATENT DOCUMENTS

| | | | |
|---|---|---|---|
| 3,971,065 A | 7/1976 | Bayer | |
| 4,846,577 A * | 7/1989 | Grindon | ................ G06T 7/0057 356/610 |
| 5,402,582 A | 4/1995 | Raab | |

(Continued)

FOREIGN PATENT DOCUMENTS

| | | |
|---|---|---|
| DE | 102011103510 A1 | 12/2012 |
| JP | 2009085775 A | 4/2009 |

(Continued)

OTHER PUBLICATIONS

Notification of Transmittal of the International Search Report and the Written Opinion of the International Searching Authority, or the Declaration; PCT/US2014/046586; Mailed Oct. 16, 2014, 10 pages.

(Continued)

*Primary Examiner* — Sang Nguyen
(74) *Attorney, Agent, or Firm* — Cantor Colburn LLP

(57) ABSTRACT

A method for measuring three-dimensional coordinates of an object surface with a line scanner, the line scanner including a projector and a camera, the projector projecting onto the object surface a first line of light at a first time and a second line of light at a second time, the integrated energy of the second line of light different than the first line of light, the camera capturing the reflections of the first line of light and the second line of light, a processor processing the collected data after discarding portions of the image that are saturated or dominated by electrical noise, and determining three-dimensional coordinates of the object surface based at least in part on the processed data and on a baseline distance.

18 Claims, 24 Drawing Sheets

(56) References Cited

U.S. PATENT DOCUMENTS

| | | | |
|---|---|---|---|
| 5,611,147 | A | 3/1997 | Raab |
| 5,986,745 | A * | 11/1999 | Hermary ............... G01B 11/25 250/559.23 |
| 6,753,876 | B2 | 6/2004 | Brooksby et al. |
| 8,773,700 | B2 | 7/2014 | Inoue et al. |
| 9,008,369 | B2 * | 4/2015 | Schofield ........... G06K 9/00818 348/211.13 |
| 2005/0278098 | A1 | 12/2005 | Breed |
| 2007/0296979 | A1 | 12/2007 | Morimoto et al. |
| 2009/0187373 | A1 | 7/2009 | Atwell et al. |
| 2010/0128109 | A1 | 5/2010 | Banks |
| 2010/0329554 | A1 | 12/2010 | Zhai et al. |
| 2011/0143811 | A1 * | 6/2011 | Rodriguez .......... G06K 9/00986 455/556.1 |
| 2011/0170534 | A1 | 7/2011 | York |
| 2011/0292406 | A1 | 12/2011 | Hollenbeck |
| 2012/0287265 | A1 | 11/2012 | Schumann et al. |
| 2013/0107032 | A1 | 5/2013 | Yamada |
| 2013/0176453 | A1 | 7/2013 | Mate et al. |
| 2014/0002608 | A1 * | 1/2014 | Atwell ................... G01B 5/008 348/46 |

FOREIGN PATENT DOCUMENTS

| | | |
|---|---|---|
| JP | 2009168658 A | 7/2009 |
| WO | 2011053678 A1 | 5/2011 |

OTHER PUBLICATIONS

Abolbashari, et al., "High dynamic range compressive imaging; a programmable imaging system", Optical Engineering, Jun. 11, 2012, Retrieved from the Internet: URL: http://dx.doi.org/10.1117/1.0E.51.7.071407; 9 pages.

Gu, Jinwei et al., "Coded Rolling Shutter Photography: Flexible Space-Time Sampling," Computational Photography (ICCP), 2010, IEEE International Conference on, IEEE, Piscataway, NJ, USA, Mar. 29, 2010, 8 pgs.

Notification of Transmittal of the International Search Report and the Written Opinion of the International Searching Authority, or the Declaration, PCT/US2014/072638; Mar. 18, 2015, 12 pages.

Notification of Transmittal of the International Search Report and the Written Opinion of the International Searching Authority, or the Declaration; PCT/US2014/050793, Dec. 9, 2014, 11 pages.

Notification of Transmittal of the International Search Report and the Written Opinion of the International Searching Authority, or the Declaration; PCT/US2014/072315, Mar. 6, 2015, 10 pages.

* cited by examiner

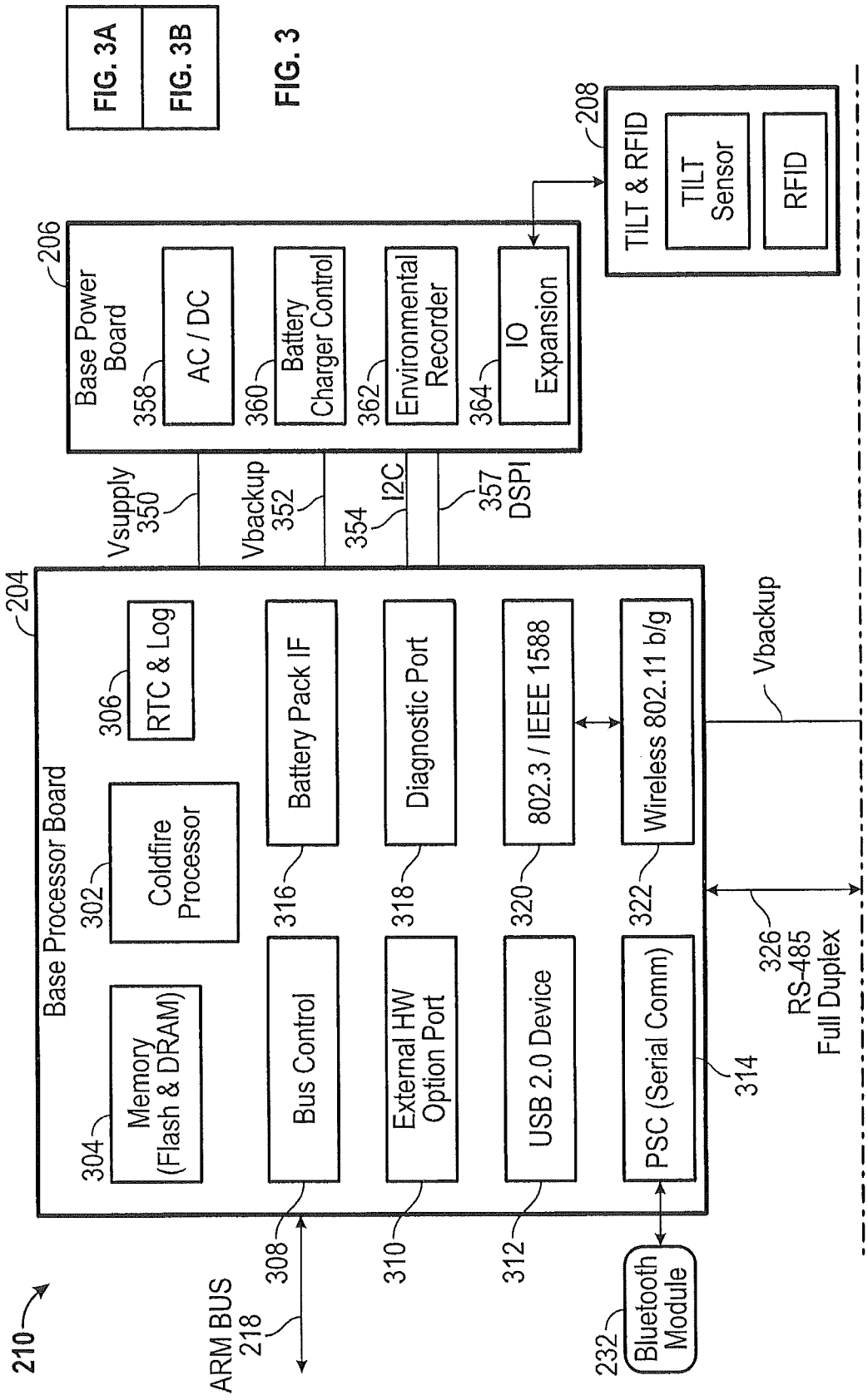

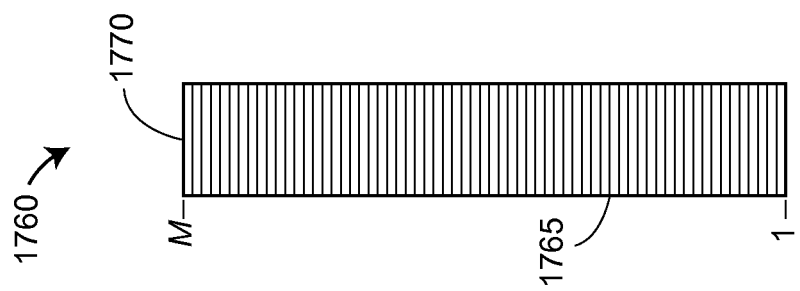
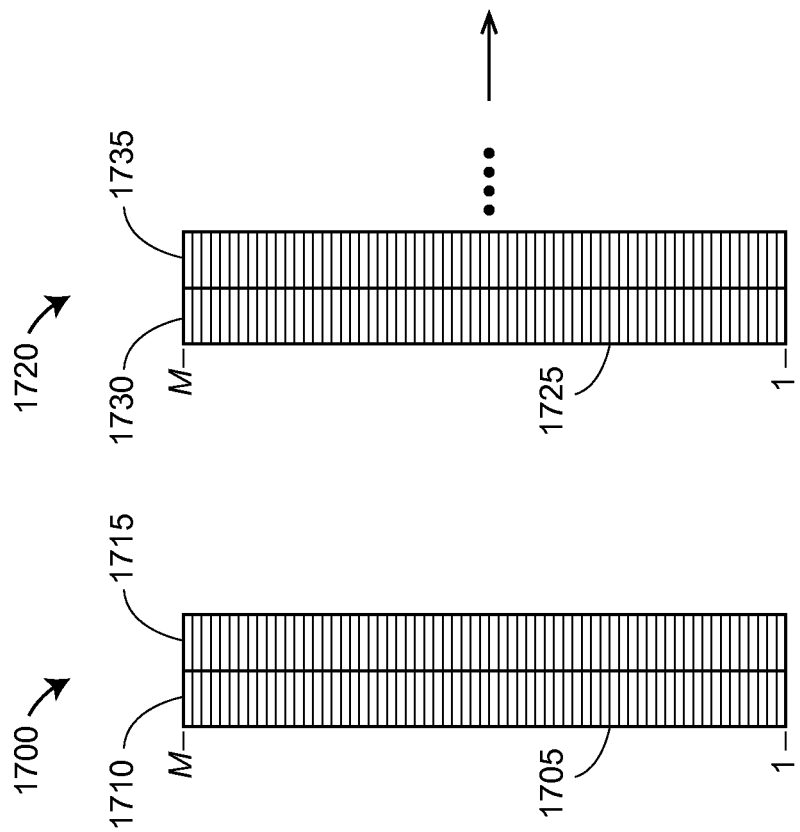

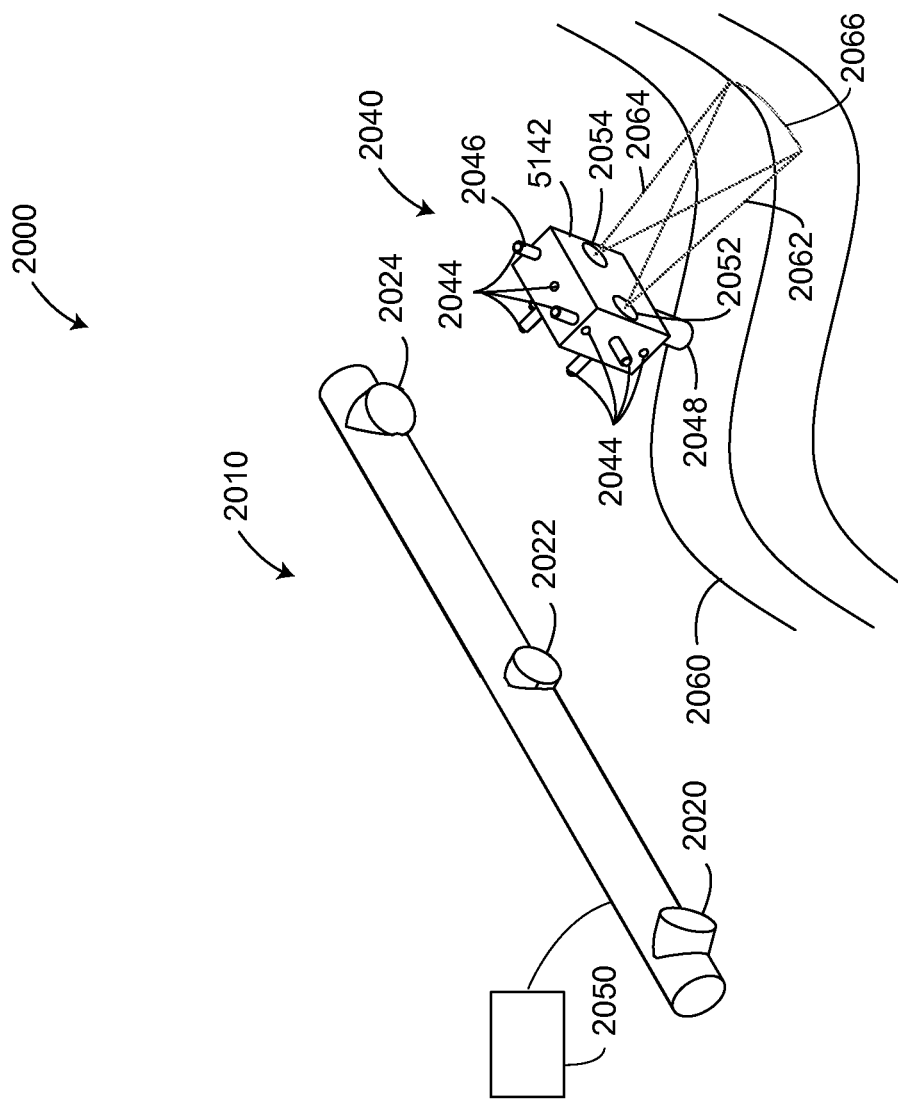

LASER LINE PROBE HAVING IMPROVED HIGH DYNAMIC RANGE

CROSS-REFERENCE TO RELATED APPLICATIONS

The present application claims priority to U.S. Provisional Patent Application Nos. 61/846,363, filed on Jul. 15, 2013, and 61/860,353, filed on Jul. 31, 2013, the entire contents of both of which are incorporated herein by reference.

FIELD OF THE INVENTION

The present disclosure relates to a laser line probe, and more particularly to a laser line probe having an improved high dynamic range with respect to its image capture capability.

BACKGROUND OF THE INVENTION

The three-dimensional ("3D") physical characteristics of surfaces of objects may be measured using various non-contact techniques and devices. Such measurements may be carried out for various reasons, including part inspection, rapid prototyping, comparison of the actual part to a CAD model of the part, reverse engineering, 3D modeling, etc. Most often, these non-contact devices utilize triangulation-based techniques for processing the raw captured data representing the surface of an object into the resulting actual measurements of the object surface.

One type of triangulation-based, non-contact device is a laser line probe ("LLP"), which includes a projector and a camera. The projector includes a light source that emits a light, typically as a line. The projector also includes a lens that projects the emitted light onto an object in a relatively clear (unblurred) state. The emitted light may be laser light, partially coherent light, or incoherent light. The camera includes a camera-type imaging device, such as a charge-coupled device ("CCD") or CMOS photosensitive array. The camera also includes a camera lens that captures the pattern of light on the object surface and converts it into a relatively clear (unblurred) state on the photosensitive array. The camera is typically positioned adjacent the laser light source within the LLP device. The projector has a virtual light emission point from which the line or stripe of light appears to "fan out" in an angle in one dimension and in a flat sheet in the orthogonal dimension. The camera has a camera perspective center through which rays of light from the pattern on the object appear to pass in traveling to the photosensitive array. The line segment between the virtual emission point and the camera perspective center is called the baseline, and the length of the baseline is called the baseline length.

In some cases, the LLP is shaped as a hand-held device. In other cases, it may be attached to a motorized device or fixed in position on a production line. The fan of light that strikes the surface of the object forms a relatively bright stripe of light on the object surface. The camera captures the 3D silhouette or profile of the laser stripe projected onto the object. For the case of a hand-held LLP, to cover all or some portion of an object with the line of light, the LLP is moved by the user such that the projected line stripe extends over all or at least the desired portion of the object within the LLP's field of view. That way, by moving the LLP over the object, hundreds of cross sections of the object surface are captured as 3D point clouds of raw data. Some modern LLPs can capture 60 frames, or stripes, of 3D data per second, or approximately 45,000 points of data per second. Signal processing electronics (e.g., a computer or a processor) are provided that run software which processes the 3D raw point cloud data into the resulting 3D image of the object that includes dimensional measurements as obtained by the LLP and its laser stripe and triangulation measurement process.

The image of the reflected line on the imaging device normally changes as the distance between the imaging device and the object surface changes. By knowing the baseline distance, the orientation of the projector and camera with respect to baseline, and the coordinates on the photosensitive array of the imaged pattern of light, known triangulation methods may be used to measure 3D coordinates of points on the surface of the object. That is, as the LLP is moved, the imaging device sees each projected line stripe. Any deviations on the photosensitive array from a straight line pattern may be translated into height variations on the object surface, thereby defining the object surface. In other words, the method described hereinabove digitizes the shape and position of the object within the field of view of the LLP. In this way the measured object may be checked against a CAD design model of the same object to determine any discrepancies therebetween.

Portable articulated arm coordinate measuring machines ("AACMMs") may include a tactile probe configured to be brought into contact with an object to determine 3D coordinates of the object surface. AACMMs have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a "hard" contact touch measurement probe (e.g., a ball) along the surface of the part or object to be measured. The measurement data are then recorded and provided to the user. In some cases, the data are provided to the user in visual form, for example, in 3D form on a computer screen. In other cases, the data are provided to the user in numeric form, for example when measuring the diameter of a hole, the text "Diameter=1.0034" is displayed on a computer screen.

An example of a prior art portable AACMM is disclosed in commonly assigned U.S. Pat. No. 5,402,582 ("the '582 patent"), which is incorporated herein by reference in its entirety. The '582 patent discloses a 3D measuring system comprised of a manually-operated AACMM having a support base on one end and a "hard" measurement probe at the other end. Commonly assigned U.S. Pat. No. 5,611,147 ("the '147 patent"), which is incorporated herein by reference in its entirety, discloses a similar AACMM. In the '147 patent, the AACMM has a number of features including an additional rotational axis at the probe end, thereby providing for an arm with either a two-two-two or a two-two-three axis configuration (the latter case being a seven axis arm).

It is generally known and accepted practice to attach a laser line probe to the probe end of an AACMM. The result is a fully integrated, portable, contact/non-contact measurement device. That is, the AACMM having an LLP attached thereto provides for both contact measurements of an object through use of the "hard" probe of the AACMM and for non-contact measurements of the object through use of the LLP's laser and imaging device. More specifically, the combination AACMM and LLP allows users to quickly inspect or reverse engineer complex and organic shapes via laser scanning, as well as to capture prismatic elements with the relatively high accuracy that contact metrology provides.

When combined as such, the AACMM and LLP may have the LLP carry out some or all of the processing of the 3D captured point cloud data using the signal processing electronics (e.g., computer or processor) within or associated with (e.g., located apart from) the AACMM. However, the LLP may have its own signal processing electronics located within the LLP or associated with the LLP (e.g., a stand-alone computer) to perform the necessary signal processing. In this case, the LLP may need to connect with a display device to view the captured data representing the object. Also, in this case the LLP may operate as a stand-alone device without the need to connect with an AACMM or similar device.

One important characteristic of any laser line probe is the dynamic range of the imaging device within the LLP. Simply put, the dynamic range of the imaging device is the range bounded on one end by the amount of relatively bright object surface portions that the imaging device is capable of accurately capturing and bounded on the other end by the amount of relatively dark object surface portions that the imaging device is capable of accurately capturing. Stated another way, the dynamic range of an imaging device is the ratio of the largest non-saturating input signal to the smallest detectable input signal. Dynamic range essentially quantifies the ability of an imaging sensor to adequately image both the highlights and the dark shadows of an object or of a larger scene. A typical real-world object or scene desired to be imaged may have a wide range of brightness values (or contrast variations) across the object surface or surfaces depending, in part, on the ambient light illuminating the object at any one point in time. For example, it is not uncommon for an object or scene to vary in brightness by 100 decibels or more.

The dynamic range required of an LLP for optimal determination of 3D coordinates of a surface is equal to the ratio of reflected optical power from the most reflective to the least reflective portions of an object surface. Dynamic range may be described as a linear ratio or, more commonly, as a logarithmic ratio in units of decibels (dB). The required dynamic range for a particular measurement depends partly on the material, color, and surface finish of the object surface, partly on the distances from a surface point to the projector and camera, and partly on the angles of incidence and reflectance of the projected and reflected light, respectively.

The dynamic range of an image sensor is the ratio of the largest optical energy to the smallest optical energy received by a pixel. To provide a valid reading, the dynamic range received by a pixel should be within the linear range of the pixel, which is to say that the energy cannot be as large as to saturate or so small as to be noise limited. To perform at an optimal level, the dynamic range of the imaging device should be equal to or greater than the dynamic range required of a particular measurement. Most commercially available imaging devices, e.g., CCD's or CMOS imagers, have a dynamic range less than 100 decibels.

An LLP with a relatively low dynamic range imaging device (e.g., a CCD camera or CMOS photosensitive array) results in a reproduced image that may be too dark is some areas and/or too light (i.e., saturated) in other areas. Thus, it may be difficult, if not impossible, to accurately determine 3D coordinates with such an LLP.

As a result, many devices and techniques exist in the prior art for extending or increasing the dynamic range of imaging devices. However, these techniques and devices tend to be lacking somewhat in the amount of increase in the dynamic range of the imaging device.

While existing laser line probes are suitable for their intended purposes, what is needed is a laser line probe having an imaging device with improved (i.e., increased) high dynamic range.

SUMMARY OF THE INVENTION

In accordance with one embodiment of the present invention, a method is given for measuring three-dimensional coordinates of a surface of an object, the method comprising providing a line scanner that includes a processor, a projector and a camera, the line scanner having a first frame of reference, the projector including a light source and a projector lens, the projector being configured to emit a line of light substantially straight when projected onto a plane perpendicular to a direction of propagation of the light, the projector having a projector perspective center, the camera including a photosensitive array and a camera lens, the camera having a camera perspective center, the camera lens being configured to form an image of a portion of the surface on the photosensitive array, the photosensitive array including an array of pixels, the array having M rows and N columns, where M and N are integers, each of the pixels in the array of pixels configured to convert an optical energy captured by each of the pixels into an electrical value corresponding to a digital value, the processor configured to receive the digital values, the line scanner having a baseline, the baseline being a straight line segment between the projector perspective center and the camera perspective center, the projector having a projector orientation with respect to the baseline, the camera having a camera orientation with respect to the baseline, the processor configured to control the light source and to receive the digital electrical signals from the photosensitive array; generating a first line of light at a first time, the first line of light having a first optical power; projecting the first line of light onto the surface; reflecting the first line of light as a first reflected light from the surface; receiving the first reflected light with the camera lens; forming with the camera lens a first image of the first reflected light on the photosensitive array over a first integration time and generating in response a first optical energy for each of the pixels, the first optical energy for each of the pixels depending at least in part on a first integrated energy, the first integrated energy equal to an integral of the first optical power over the first integration time; sending for each of the pixels a first digital value to the processor to obtain a first M×N array of first digital values; generating a second line of light at a second time, the second line of light having a second optical power; projecting the second line of light onto the surface; reflecting the second line of light as a second reflected light from the surface; receiving the second reflected light with the camera lens; forming with the camera lens a second image of the second reflected light on the photosensitive array over a second integration time and generating in response a second optical energy for each of the pixels, the second optical energy for each of the pixels depending at least in part on a second integrated energy, the second integrated energy equal to an integral of the second optical power over the second integration time, wherein the second integrated energy is different than the first integrated energy; sending for each of the pixels a second digital value to the processor to obtain a second M×N array of second digital values; determining with the processor for each of the M rows of the first M×N array a first maximum digital value and a first center value, the first maximum digital value for the row equal to a maximum of the N first digital values of the row, the first center value based at least in part on at least one of the N first digital values of the row; determining with the processor for each of the M rows of the second M×N array a second maximum digital value and a second center value, the second maximum digital value for the row equal to a maximum of the N second digital values of the row, the second center value based at least in part on at least one of the N second digital values of the row; determining with the processor a composite center value for each row in which a first condition or a second condition is met, the first condition being that the first maximum digital value is less than a saturation level and exceeds a noise level, the second condition being that the second maximum digital value is less than the saturation level and exceeds the noise level, the composite center value based at least in part on the first center value and the second center value; calculating with the processor for each of the M rows having a composite center value three-dimensional coordinates of a point on the surface, the three-dimensional coordinates calculated in the first frame of reference, the three-dimensional coordinates based at least in part on the composite center value, a length of the baseline, the projector orientation, and the camera orientation; and storing the three-dimensional coordinates for each of the M rows having a composite center value.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including

FIGS. 17A and B illustrate a data array obtained for a first image and a second image, respectively, and FIG. 17C illustrates a data array that includes composite center values;

FIG. 20 is a perspective view of a camera bar used to locate a line scanner according to an embodiment.

DETAILED DESCRIPTION

Figure 1A:
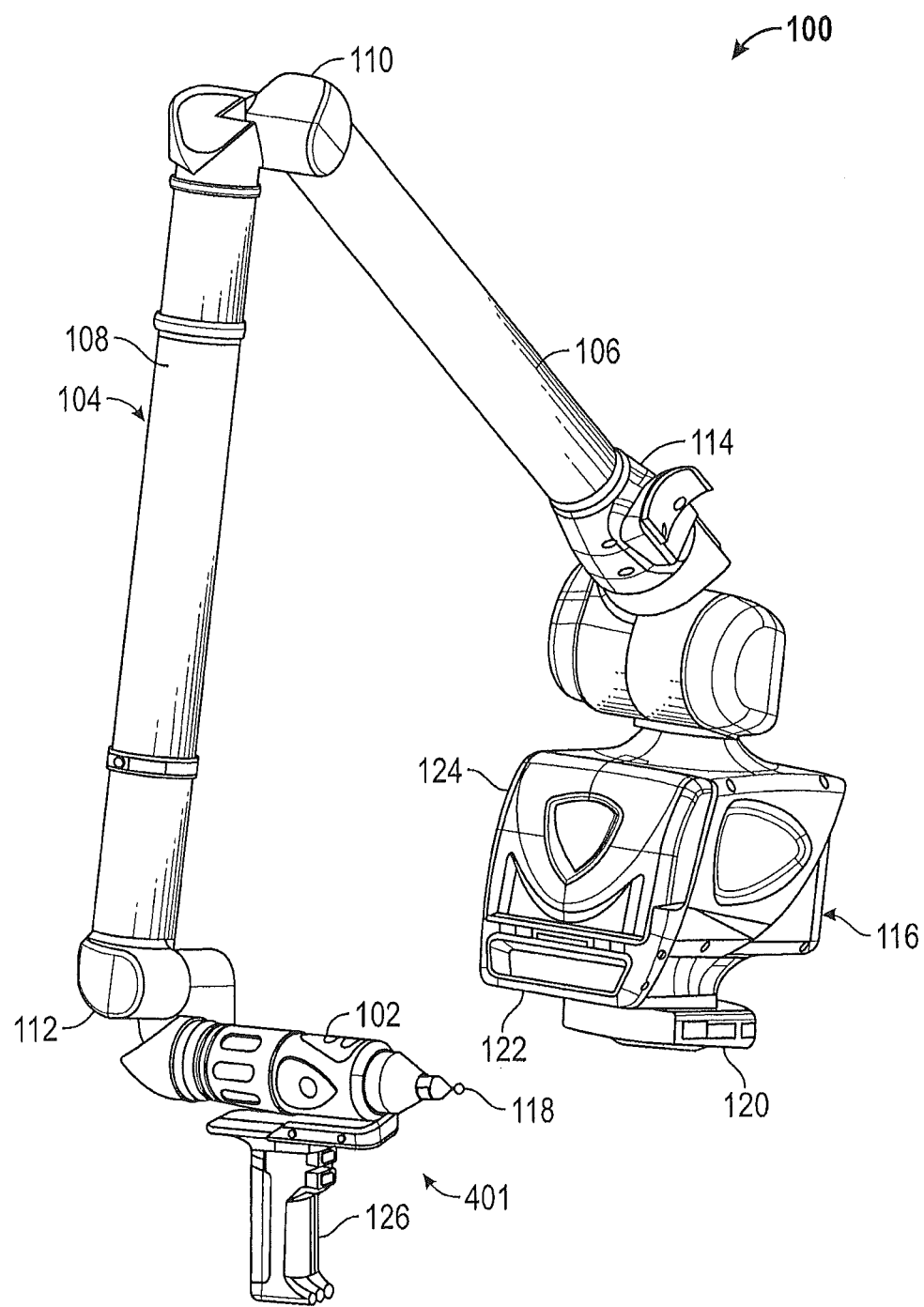
FIGS. 1A and 1B, are perspective views of a portable articulated arm coordinate measuring machine (AACMM) having embodiments of various aspects of the present invention therewithin.
Figure 1B:
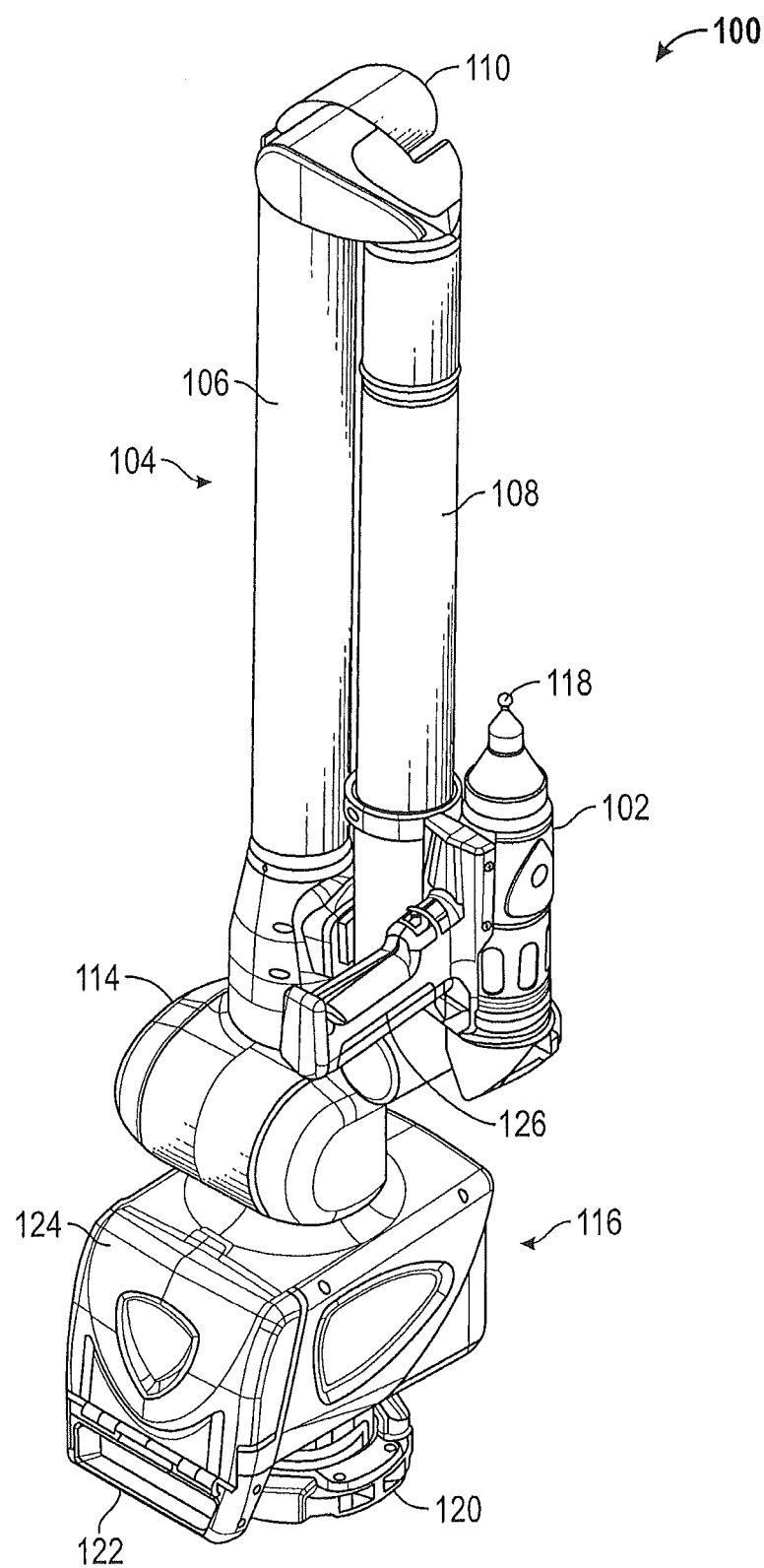

FIGS. 1A and 1B illustrate, in perspective, an articulated arm coordinate measuring machine ("AACMM") 100 according to various embodiments of the present invention, an articulated arm being one type of coordinate measuring machine. As shown in FIGS. 1A and 1B, the exemplary AACMM 100 may comprise a six or seven axis articulated measurement device having a probe end 401 that includes a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end 401 may include a measurement probe housing 102 that comprises the shaft of the seventh axis portion of the AACMM 100 (e.g., a cartridge containing an encoder system that determines movement of the measurement device, for example a probe 118, in the seventh axis of the AACMM 100). In this embodiment, the probe end 401 may rotate about an axis extending through the center of measurement probe housing 102. In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. As discussed in more detail hereinafter with reference to FIG. 10 et seq., the handle 126 may be replaced or interchanged with another device such as a laser line probe ("LLP"), which is configured to emit a line of laser light to an object and to capture or image the laser light on a surface of the object with an imaging device (e.g., a camera) that is part of the LLP, to thereby provide for non-contact measurement of the dimensions of three-dimensional objects. This interchangeable feature and use of an LLP has the advantage in allowing the operator to make both contact and non-contact measurements with the same AACMM 100. However, it should be understood that the LLP may be a standalone device, as described in more detail hereinafter. That is, the LLP may be fully functional and operable by itself without any type of connection to the AACMM 100 or similar device.

In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as the LLP. In an embodiment, the handle 126 is replaced with the LLP using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2D, the removable handle 126 may also include an electrical connector that allows electrical power and data to be exchanged with the handle 126 and the corresponding electronics located in the probe end 401.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail hereinafter. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor, for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic circuit having an electronic data processing system that includes two primary components: a base processing system that processes the data from the various encoder systems within the AACMM 100 as well as data representing other arm parameters to support three-dimensional ("3D") positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a laser line probe that can be mounted in place of the removable handle 126 on the AACMM 100). The electronics that support these peripheral hardware devices or features may be located in each of the bearing cartridge groupings 110, 112, 114 located within the portable AACMM 100.

Figure 2:
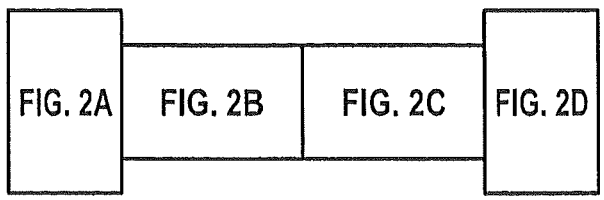
FIG. 2, including FIGS. 2A-2D taken together, is a block diagram of electronics utilized as part of the AACMM of FIG. 1 in accordance with an embodiment.

FIG. 2 is a block diagram of electronics utilized in an AACMM 100 in accordance with an embodiment. The embodiment shown in FIG. 2A includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

Figure 2A:
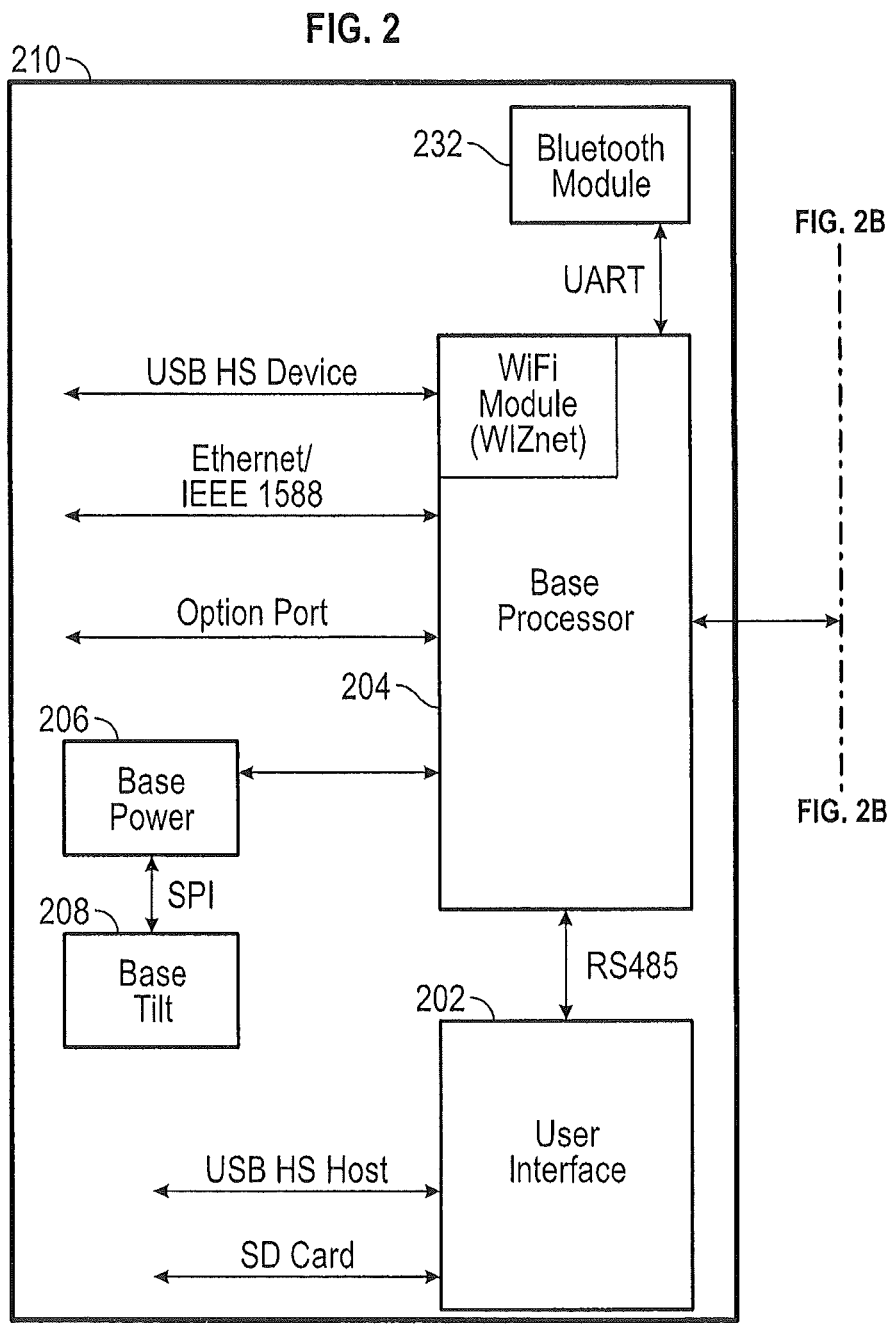
Figure 2B:
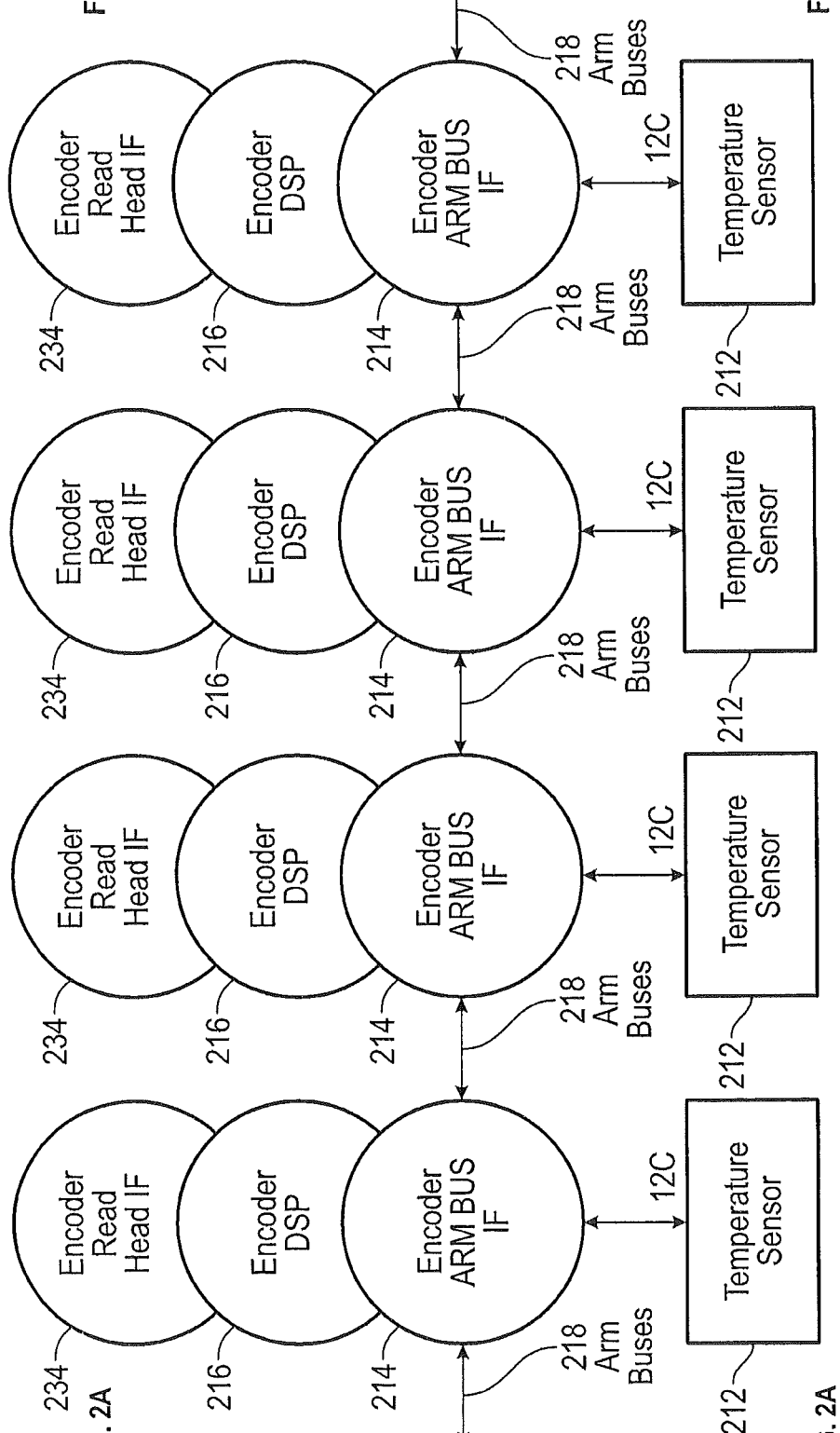
Figure 2C:
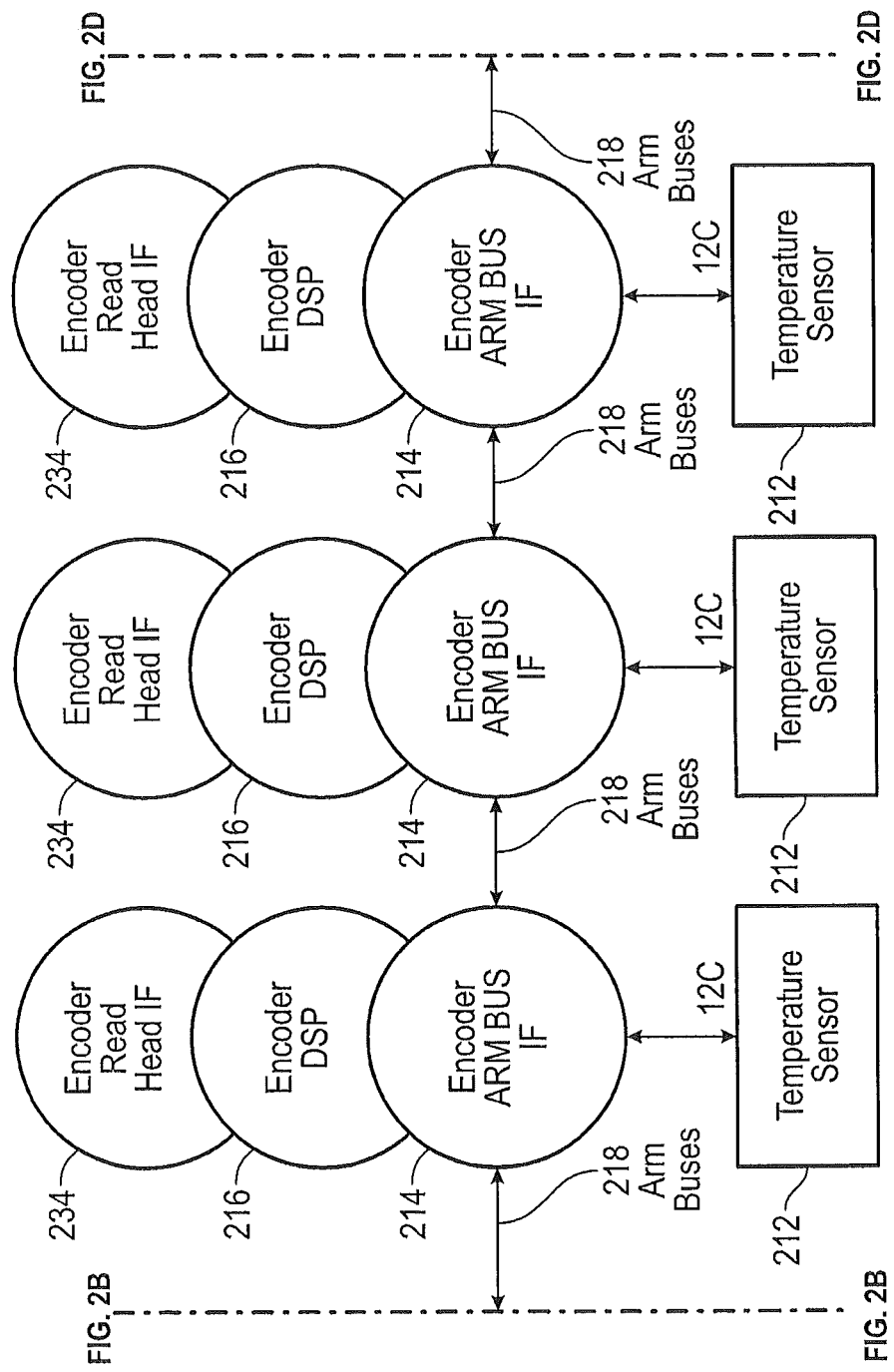

As shown in FIG. 2A and FIG. 2B, the electronic data processing system 210 is in communication with the aforementioned plurality of encoder systems via one or more arm buses 218. In the embodiment depicted in FIG. 2B and FIG. 2C, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Figure 2D:
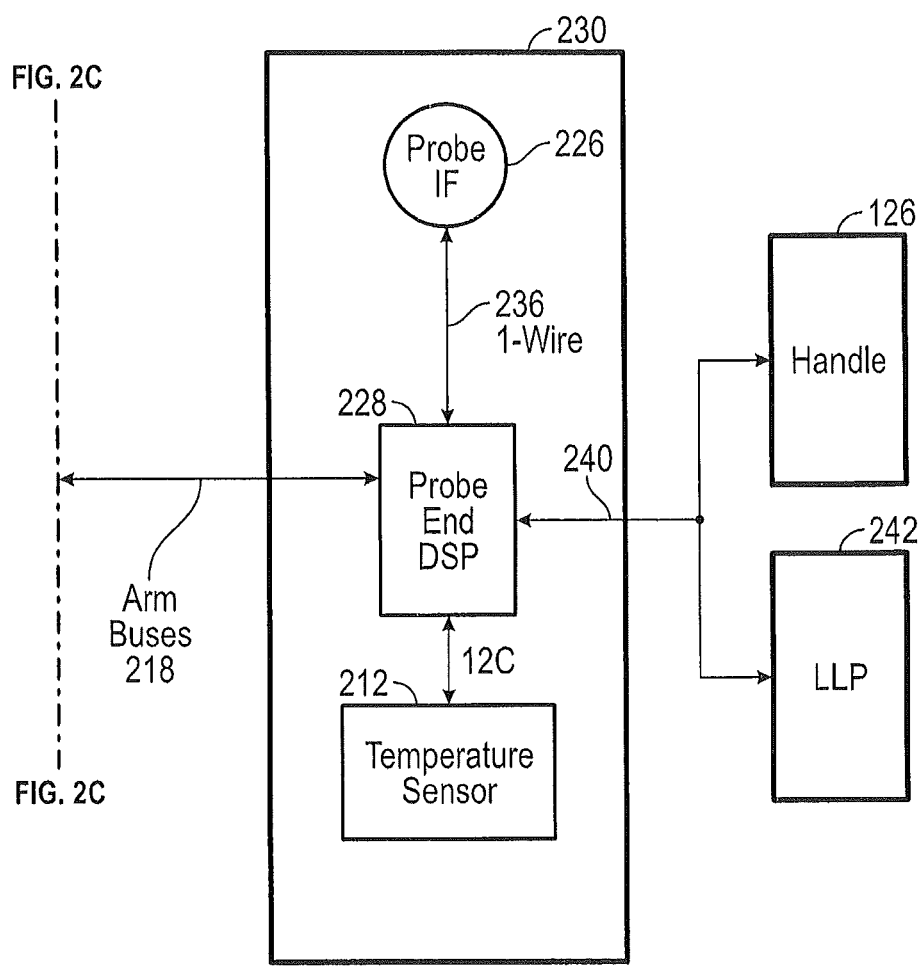

Also shown in FIG. 2D are probe end electronics 230 that are in communication with the arm bus 218. The probe end electronics 230 include a probe end DSP 228, a temperature sensor 212, a handle/device interface bus 240 that connects with the handle 126 or the laser line probe ("LLP") 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the LLP 242 communicating with the probe end electronics 230 of the AACMM 100 via the interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-Wire® communications protocol 236.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3A, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as the LLP 242. A real time clock (RTC) and log 306, a battery pack interface (IF) 316, and a diagnostic port 318 are also included in the functionality in an embodiment of the base processor board 204 depicted in FIG. 3A.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Figure 3B:
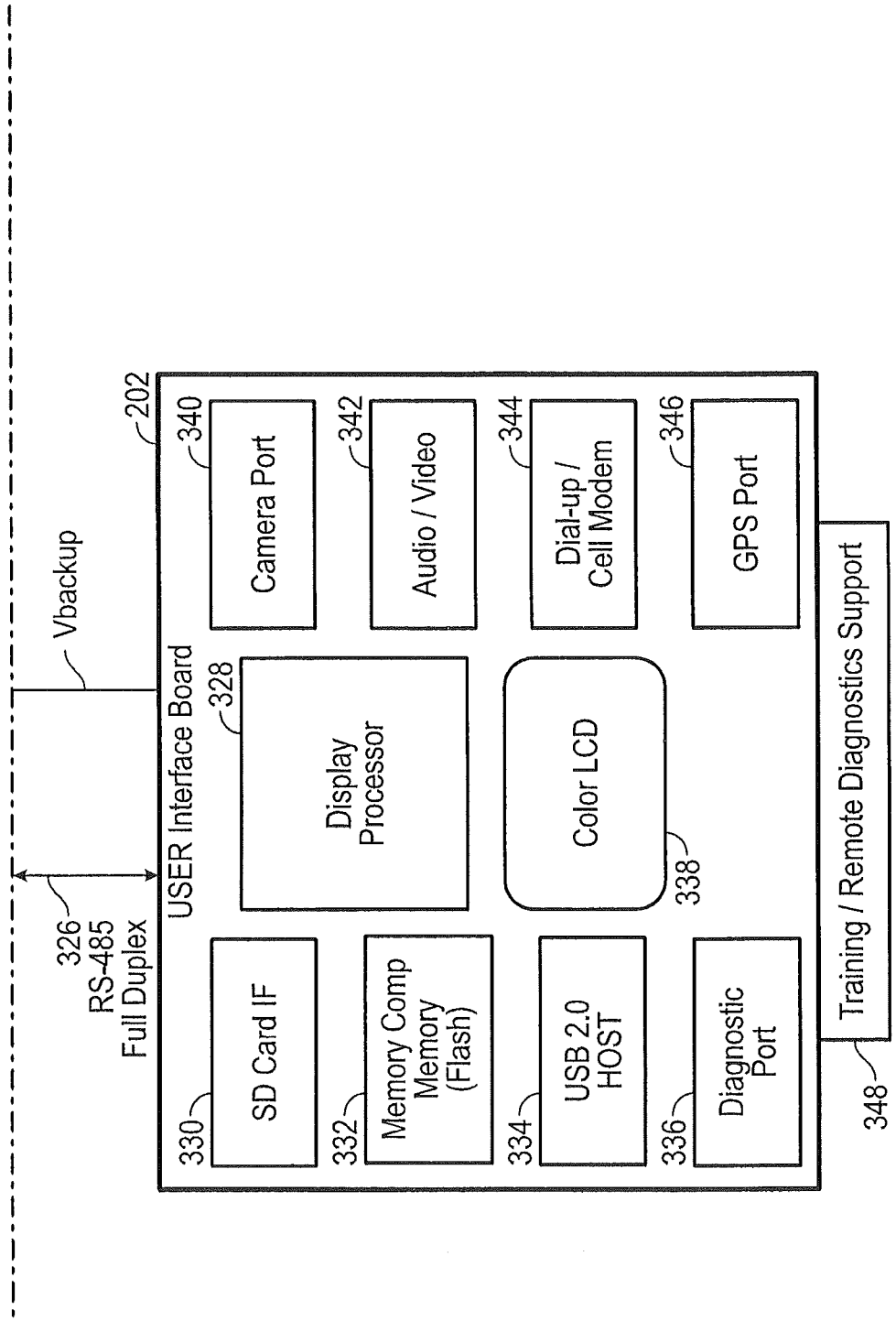
FIG. 3, including FIGS. 3A and 3B taken together, is a block diagram describing detailed features of the electronic data processing system of FIG. 2 in accordance with an embodiment.
Figure 4:
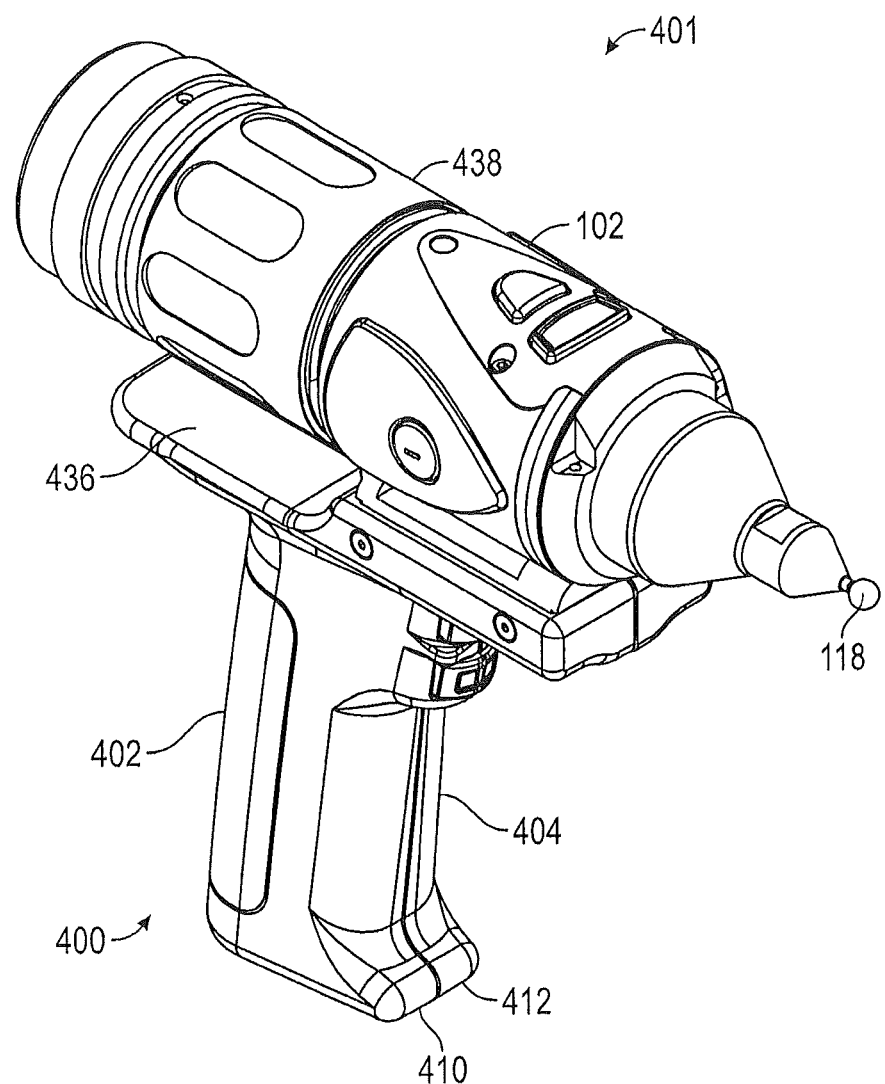
FIG. 4 is an isometric view of the probe end of the AACMM of FIG. 1.

Turning now to the user interface board 202 in FIG. 3B, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3A also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 357. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3A and FIG. 3B. For example, in one embodiment, the base processor board 204 and the user interface board 202 are combined into one physical board.

Figure 7:
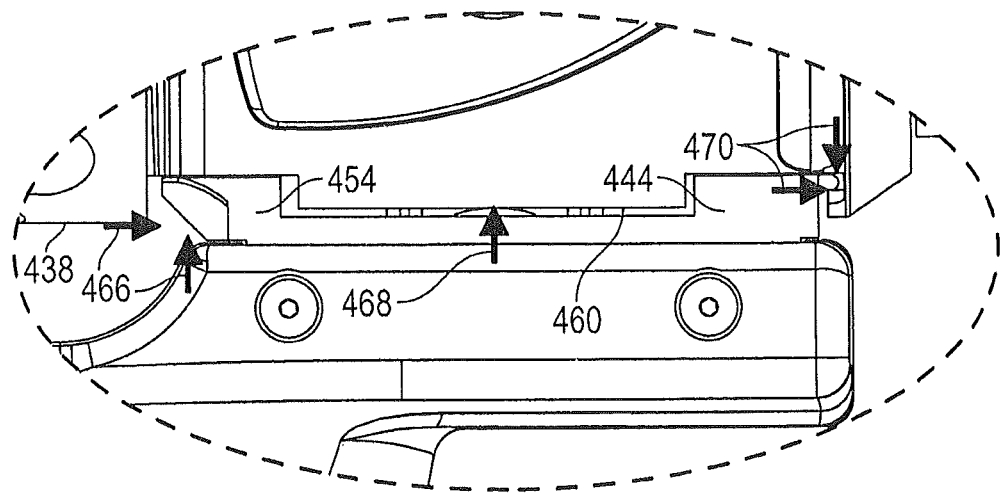
FIG. 7 is an enlarged partial side view of the interface portion of the probe end of FIG. 6.
Figure 8:
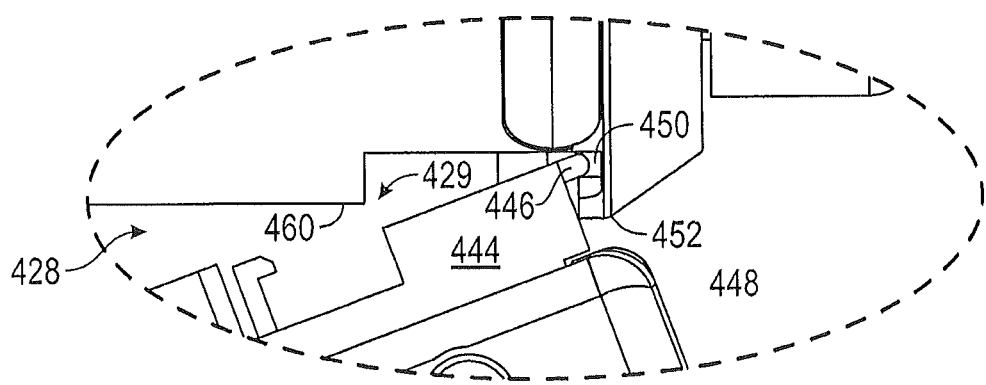
FIG. 8 is another enlarged partial side view of the interface portion of the probe end of FIG. 5.
Figure 9:
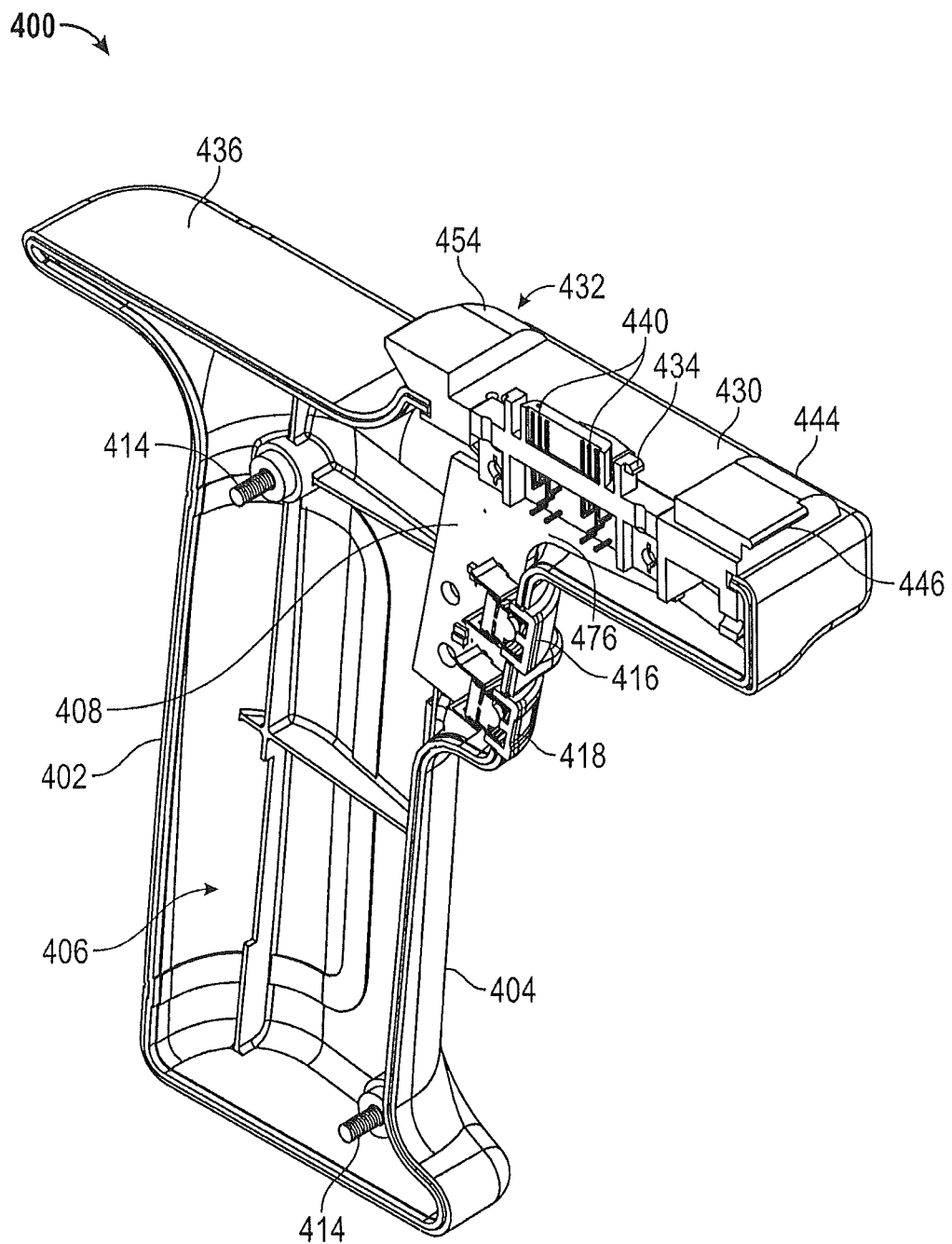
FIG. 9 is an isometric view partially in section of the handle of FIG. 4.

Referring now to FIGS. 4-9, an exemplary embodiment of a probe end 401 is illustrated having a measurement probe housing 102 with a quick-connect mechanical and electrical interface that allows removable and interchangeable device 400 to couple with AACMM 100. In the exemplary embodiment, the device 400 includes an enclosure 402 that includes a handle portion 404 that is sized and shaped to be held in an operator's hand, such as in a pistol grip for example. The enclosure 402 is a thin wall structure having a cavity 406 (FIG. 9). The cavity 406 is sized and configured to receive a controller 408. The controller 408 may be a digital circuit, having a microprocessor for example, or an analog circuit. In one embodiment, the controller 408 is in asynchronous bidirectional communication with the electronic data processing system 210 (FIGS. 2 and 3). The communication connection between the controller 408 and the electronic data processing system 210 may be wired (e.g. via controller 420) or may be a direct or indirect wireless connection (e.g. Bluetooth or IEEE 802.11) or a combination of wired and wireless connections. In the exemplary embodiment, the enclosure 402 is formed in two halves 410, 412, such as from an injection molded plastic material for example. The halves 410, 412 may be secured together by fasteners, such as screws 414 for example. In other embodiments, the enclosure halves 410, 412 may be secured together by adhesives or ultrasonic welding for example.

The handle portion 404 also includes buttons or actuators 416, 418 that may be manually activated by the operator. The actuators 416, 418 are coupled to the controller 408 that transmits a signal to a controller 420 within the probe housing 102. In the exemplary embodiments, the actuators 416, 418 perform the functions of actuators 422, 424 located on the probe housing 102 opposite the device 400. It should be appreciated that the device 400 may have additional switches, buttons or other actuators that may also be used to control the device 400, the AACMM 100 or vice versa. Also, the device 400 may include indicators, such as light emitting diodes (LEDs), sound generators, meters, displays or gauges for example. In one embodiment, the device 400 may include a digital voice recorder that allows for synchronization of verbal comments with a measured point. In yet another embodiment, the device 400 includes a microphone that allows the operator to transmit voice activated commands to the electronic data processing system 210.

In one embodiment, the handle portion 404 may be configured to be used with either operator hand or for a particular hand (e.g. left handed or right handed). The handle portion 404 may also be configured to facilitate operators with disabilities (e.g. operators with missing fingers or operators with prosthetic arms). Further, the handle portion 404 may be removed and the probe housing 102 used by itself when clearance space is limited. As discussed above, the probe end 401 may also comprise the shaft of the seventh axis of AACMM 100. In this embodiment the device 400 may be arranged to rotate about the AACMM seventh axis.

The probe end 401 includes a mechanical and electrical interface 426 having a first connector 429 (FIG. 8) on the device 400 that cooperates with a second connector 428 on the probe housing 102. The connectors 428, 429 may include electrical and mechanical features that allow for coupling of the device 400 to the probe housing 102. In one embodiment, the interface 426 includes a first surface 430 having a mechanical coupler 432 and an electrical connector 434 thereon. The enclosure 402 also includes a second surface 436 positioned adjacent to and offset from the first surface 430. In the exemplary embodiment, the second surface 436 is a planar surface offset a distance of approximately 0.5 inches from the first surface 430. This offset provides a clearance for the operator's fingers when tightening or loosening a fastener such as collar 438. The interface 426 provides for a relatively quick and secure electronic connection between the device 400 and the probe housing 102 without the need to align connector pins, and without the need for separate cables or connectors.

The electrical connector 434 extends from the first surface 430 and includes one or more connector pins 440 that are electrically coupled in asynchronous bidirectional communication with the electronic data processing system 210 (FIGS. 2 and 3), such as via one or more arm buses 218 for example. The bidirectional communication connection may be wired (e.g. via arm bus 218), wireless (e.g. Bluetooth or IEEE 802.11), or a combination of wired and wireless connections. In one embodiment, the electrical connector 434 is electrically coupled to the controller 420. The controller 420 may be in asynchronous bidirectional communication with the electronic data processing system 210 such as via one or more arm buses 218 for example. The electrical connector 434 is positioned to provide a relatively quick and secure electronic connection with electrical connector 442 on probe housing 102. The electrical connectors 434, 442 connect with each other when the device 400 is attached to the probe housing 102. The electrical connectors 434, 442 may each comprise a metal encased connector housing that provides shielding from electromagnetic interference as well as protecting the connector pins and assisting with pin alignment during the process of attaching the device 400 to the probe housing 102.

The mechanical coupler 432 provides relatively rigid mechanical coupling between the device 400 and the probe housing 102 to support relatively precise applications in which the location of the device 400 on the end of the arm portion 104 of the AACMM 100 preferably does not shift or move. Any such movement may typically cause an undesirable degradation in the accuracy of the measurement result. These desired results are achieved using various structural features of the mechanical attachment configuration portion of the quick connect mechanical and electronic interface of an embodiment of the present invention.

In one embodiment, the mechanical coupler 432 includes a first projection 444 positioned on one end 448 (the leading edge or "front" of the device 400). The first projection 444 may include a keyed, notched or ramped interface that forms a lip 446 that extends from the first projection 444. The lip 446 is sized to be received in a slot 450 defined by a projection 452 extending from the probe housing 102 (FIG. 8). It should be appreciated that the first projection 444 and the slot 450 along with the collar 438 form a coupler arrangement such that when the lip 446 is positioned within the slot 450, the slot 450 may be used to restrict both the longitudinal and lateral movement of the device 400 when attached to the probe housing 102. As will be discussed in more detail below, the rotation of the collar 438 may be used to secure the lip 446 within the slot 450.

Figure 5:
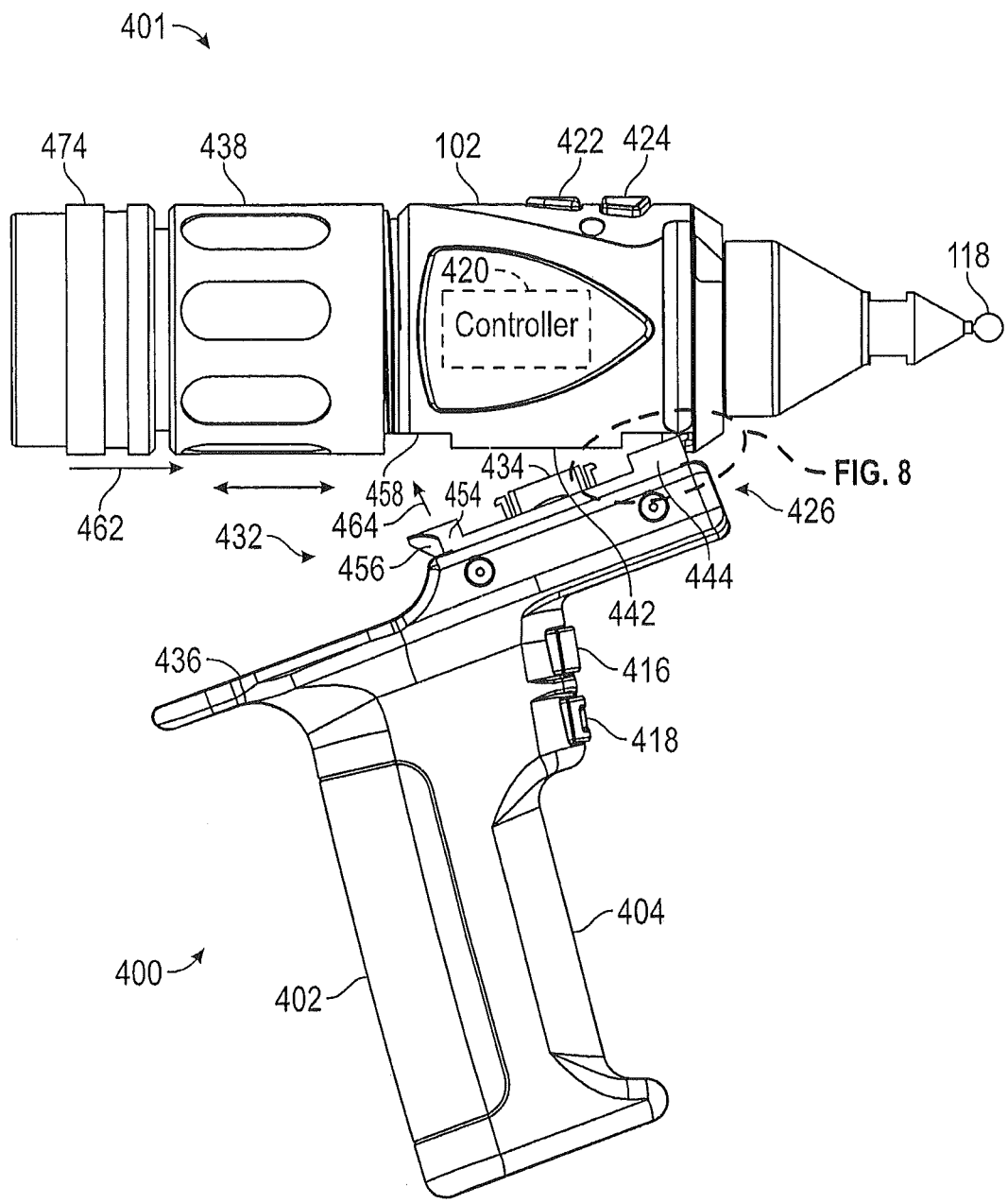
FIG. 5 is a side view of the probe end of FIG. 4 with the handle being coupled thereto.

Opposite the first projection 444, the mechanical coupler 432 may include a second projection 454. The second projection 454 may have a keyed, notched-lip or ramped interface surface 456 (FIG. 5). The second projection 454 is positioned to engage a fastener associated with the probe housing 102, such as collar 438 for example. As will be discussed in more detail below, the mechanical coupler 432 includes a raised surface projecting from surface 430 that adjacent to or disposed about the electrical connector 434 which provides a pivot point for the interface 426 (FIGS. 7 and 8). This serves as the third of three points of mechanical contact between the device 400 and the probe housing 102 when the device 400 is attached thereto.

The probe housing 102 includes a collar 438 arranged co-axially on one end. The collar 438 includes a threaded portion that is movable between a first position (FIG. 5) and a second position (FIG. 7). By rotating the collar 438, the collar 438 may be used to secure or remove the device 400 without the need for external tools. Rotation of the collar 438 moves the collar 438 along a relatively coarse, square-threaded cylinder 474. The use of such relatively large size, square-thread and contoured surfaces allows for significant clamping force with minimal rotational torque. The coarse pitch of the threads of the cylinder 474 further allows the collar 438 to be tightened or loosened with minimal rotation.

Figure 6:
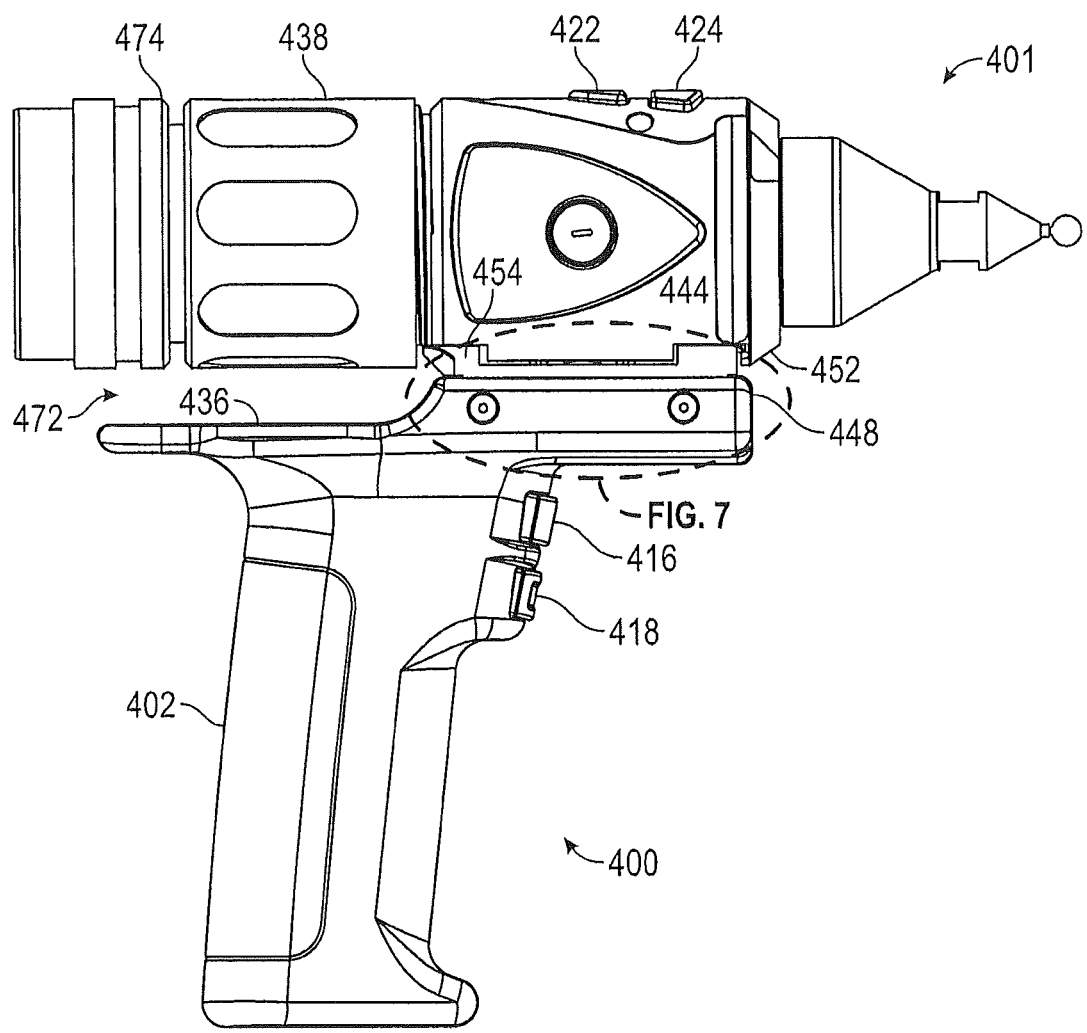
FIG. 6 is a side view of the probe end of FIG. 4 with the handle attached.

To couple the device 400 to the probe housing 102, the lip 446 is inserted into the slot 450 and the device is pivoted to rotate the second projection 454 toward surface 458 as indicated by arrow 464 (FIG. 5). The collar 438 is rotated causing the collar 438 to move or translate in the direction indicated by arrow 462 into engagement with surface 456. The movement of the collar 438 against the angled surface 456 drives the mechanical coupler 432 against the raised surface 460. This assists in overcoming potential issues with distortion of the interface or foreign objects on the surface of the interface that could interfere with the rigid seating of the device 400 to the probe housing 102. The application of force by the collar 438 on the second projection 454 causes the mechanical coupler 432 to move forward pressing the lip 446 into a seat on the probe housing 102. As the collar 438 continues to be tightened, the second projection 454 is pressed upward toward the probe housing 102 applying pressure on a pivot point. This provides a see-saw type arrangement, applying pressure to the second projection 454, the lip 446 and the center pivot point to reduce or eliminate shifting or rocking of the device 400. The pivot point presses directly against the bottom on the probe housing 102 while the lip 446 is applies a downward force on the end of probe housing 102. FIG. 5 includes arrows 462, 464 to show the direction of movement of the device 400 and the collar 438. FIG. 7 includes arrows 466, 468, 470 to show the direction of applied pressure within the interface 426 when the collar 438 is tightened. It should be appreciated that the offset distance of the surface 436 of device 400 provides a gap 472 between the collar 438 and the surface 436 (FIG. 6). The gap 472 allows the operator to obtain a firmer grip on the collar 438 while reducing the risk of pinching fingers as the collar 438 is rotated. In one embodiment, the probe housing 102 is of sufficient stiffness to reduce or prevent the distortion when the collar 438 is tightened.

Embodiments of the interface 426 allow for the proper alignment of the mechanical coupler 432 and electrical connector 434 and also protect the electronics interface from applied stresses that may otherwise arise due to the clamping action of the collar 438, the lip 446 and the surface 456. This provides advantages in reducing or eliminating stress damage to circuit board 476 mounted electrical connectors 434, 442 that may have soldered terminals. Also, embodiments provide advantages over known approaches in that no tools are required for a user to connect or disconnect the device 400 from the probe housing 102. This allows the operator to manually connect and disconnect the device 400 from the probe housing 102 with relative ease.

Due to the relatively large number of shielded electrical connections possible with the interface 426, a relatively large number of functions may be shared between the AACMM 100 and the device 400. For example, switches, buttons or other actuators located on the AACMM 100 may be used to control the device 400 or vice versa. Further, commands and data may be transmitted from electronic data processing system 210 to the device 400. In one embodiment, the device 400 is a video camera that transmits data of a recorded image to be stored in memory on the base processor 204 or displayed on the display 328. In another embodiment the device 400 is an image projector that receives data from the electronic data processing system 210. In addition, temperature sensors located in either the AACMM 100 or the device 400 may be shared by the other. It should be appreciated that embodiments of the present invention provide advantages in providing a flexible interface that allows a wide variety of accessory devices 400 to be quickly, easily and reliably coupled to the AACMM 100. Further, the capability of sharing functions between the AACMM 100 and the device 400 may allow a reduction in size, power consumption and complexity of the AACMM 100 by eliminating duplicity.

In one embodiment, the controller 408 may alter the operation or functionality of the probe end 401 of the AACMM 100. For example, the controller 408 may alter indicator lights on the probe housing 102 to either emit a different color light, a different intensity of light, or turn on/off at different times when the device 400 is attached versus when the probe housing 102 is used by itself. In one embodiment, the device 400 includes a range finding sensor (not shown) that measures the distance to an object. In this embodiment, the controller 408 may change indicator lights on the probe housing 102 in order to provide an indication to the operator how far away the object is from the probe tip 118. In another embodiment, the controller 408 may change the color of the indicator lights based on the quality of the image acquired by the LLP 242. This provides advantages in simplifying the requirements of controller 420 and allows for upgraded or increased functionality through the addition of accessory devices.

Figure 10:
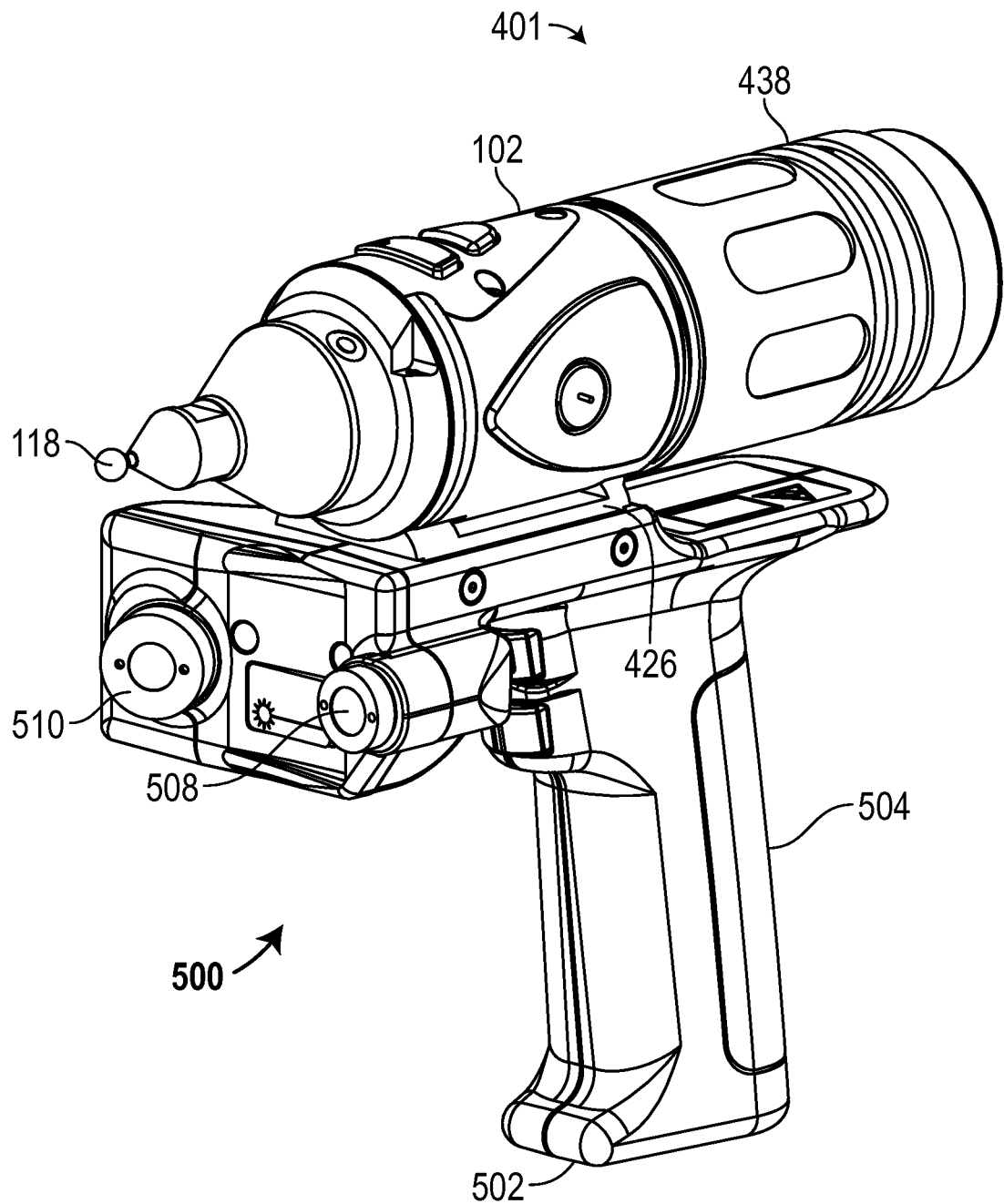
FIG. 10 is an isometric view of the probe end of the AACMM of FIG. 1 with a laser line probe having a single camera attached.
Figure 11:
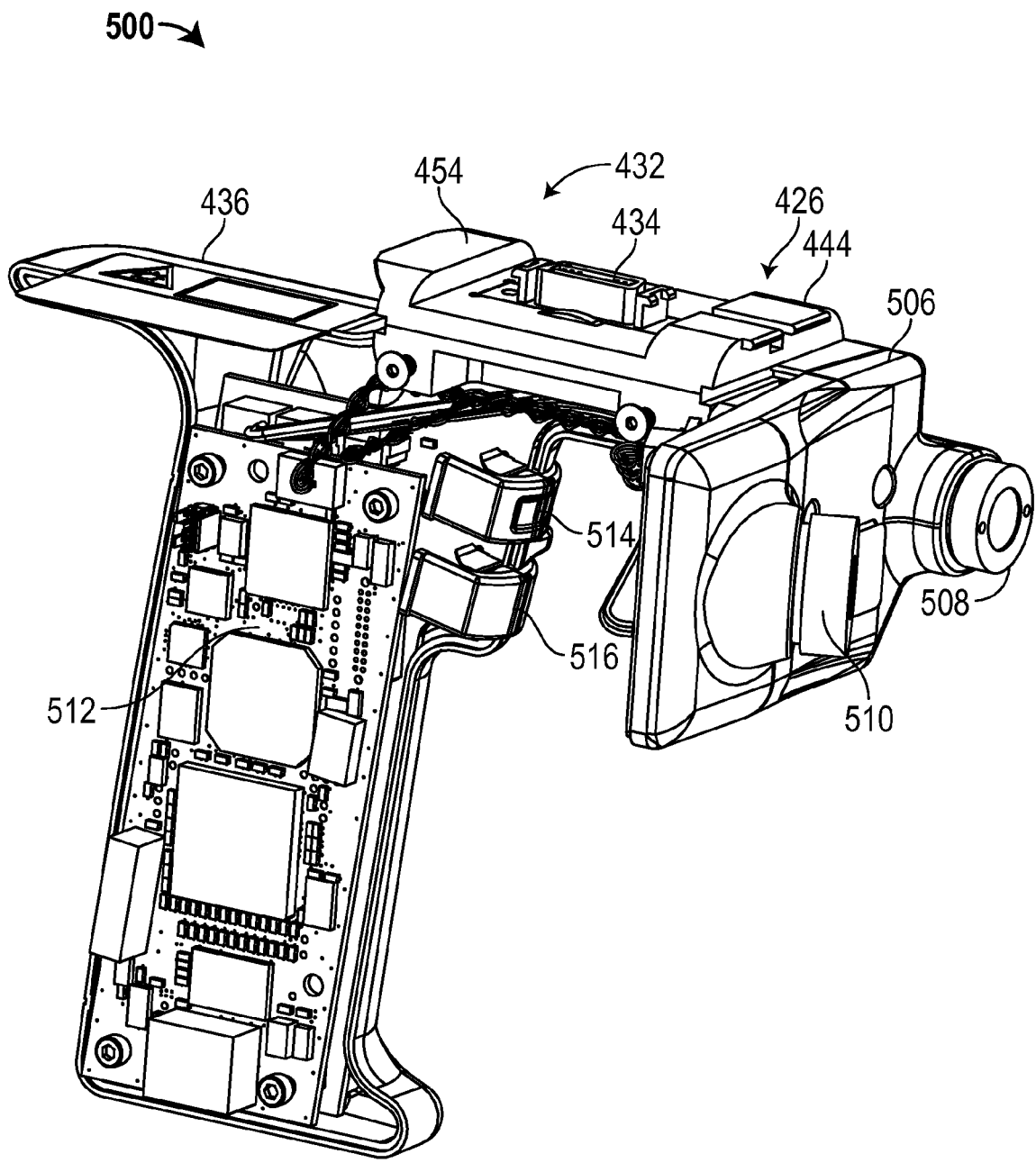
FIG. 11 is an isometric view partially in section of the laser line probe of FIG. 10.

Referring to FIGS. 10-11, embodiments of the present invention provide advantages for camera, signal processing, control, and indicator interfaces for a laser line probe (LLP) 500, which is part of a measurement unit 490. The LLP 500 may be the same as LLP 242 as referenced hereinabove with respect to FIGS. 1-9. The LLP 500 provides for non-contact measurements of an object, typically in the same frame of reference as that of the hard probe 118 of the AACMM 100, as discussed hereinabove. Further, the calculated three-dimensional coordinates of surface points provided by the LLP 500 are based on the known principles of triangulation, as explained in more detail hereinbelow. The LLP 500 may include an enclosure 502 with a handle portion 504. The LLP 500 further includes an interface 426 on one end that mechanically and electrically couples the LLP 500 to the probe housing 102 as described hereinabove. The interface 426 allows the LLP 500 to be coupled and removed from the AACMM 100 quickly and easily without requiring additional tools.

Adjacent the interface 426, the enclosure 502 has a portion 506 that includes a projector 508 and a camera 510. In the exemplary embodiment, the projector 508 uses a light source that generates a straight line projected onto an object surface. The light source may be a laser, a superluminescent diode (SLD), an incandescent light, a light emitting diode (LED), for example. The projected light may be visible or invisible, but visible light may be more convenient in some cases. The camera 510 includes a lens and an imaging sensor. The imaging sensor is a photosensitive array that may be a charge-coupled device (CCD) two-dimensional ("2D") area sensor or a complementary metal-oxide-semiconductor (CMOS) 2D area sensor, for example, or it may be some other type of device. Each imaging sensor may comprise a 2D array (i.e., rows, columns) of a plurality of light sensing picture elements ("pixels"). Each pixel typically contains at least one photodetector that converts light into an electric charge stored within the pixel wells, and read out as a voltage value. Voltage values are converted into digital values by an analog-to-digital converter (ADC). Typically for a CMOS sensor chip, the ADC is contained within the sensor chip. Typically for a CCD sensor chip, the ADC is included outside the sensor chip on a circuit board.

In an exemplary embodiment, the projector 508 and camera 510 are oriented to enable reflected light to be imaged by the photosensitive array. In one embodiment, the LLP 500 is offset from the probe tip 118 to enable the LLP 500 to be operated without interference from the probe tip 118. In other words, the LLP 500 may be operated with the probe tip 118 in place. Further, it should be appreciated that the LLP 500 is substantially fixed relative to the probe tip 118 so that forces on the handle portion 504 do not influence the alignment of the LLP 500 relative to the probe tip 118. In one embodiment, the LLP 500 may have an additional actuator (not shown) that allows the operator to switch between acquiring data from the LLP 500 and the probe tip 118.

The projector 508 and camera 510 are electrically coupled to a controller 512 disposed within the enclosure 502. The controller 512 may include one or more microprocessors, digital signal processors, memory, and other types of signal conditioning and/or storage circuits. Due to the large data volume generated by the LLP 500, the controller 512 may be arranged within the handle portion 504. The controller 512 is electrically coupled to the arm buses 218 via electrical connector 434. The LLP 500 further includes actuators 514, 516 which may be manually activated by the operator to initiate operation and data capture by the LLP 500.

Figure 12:
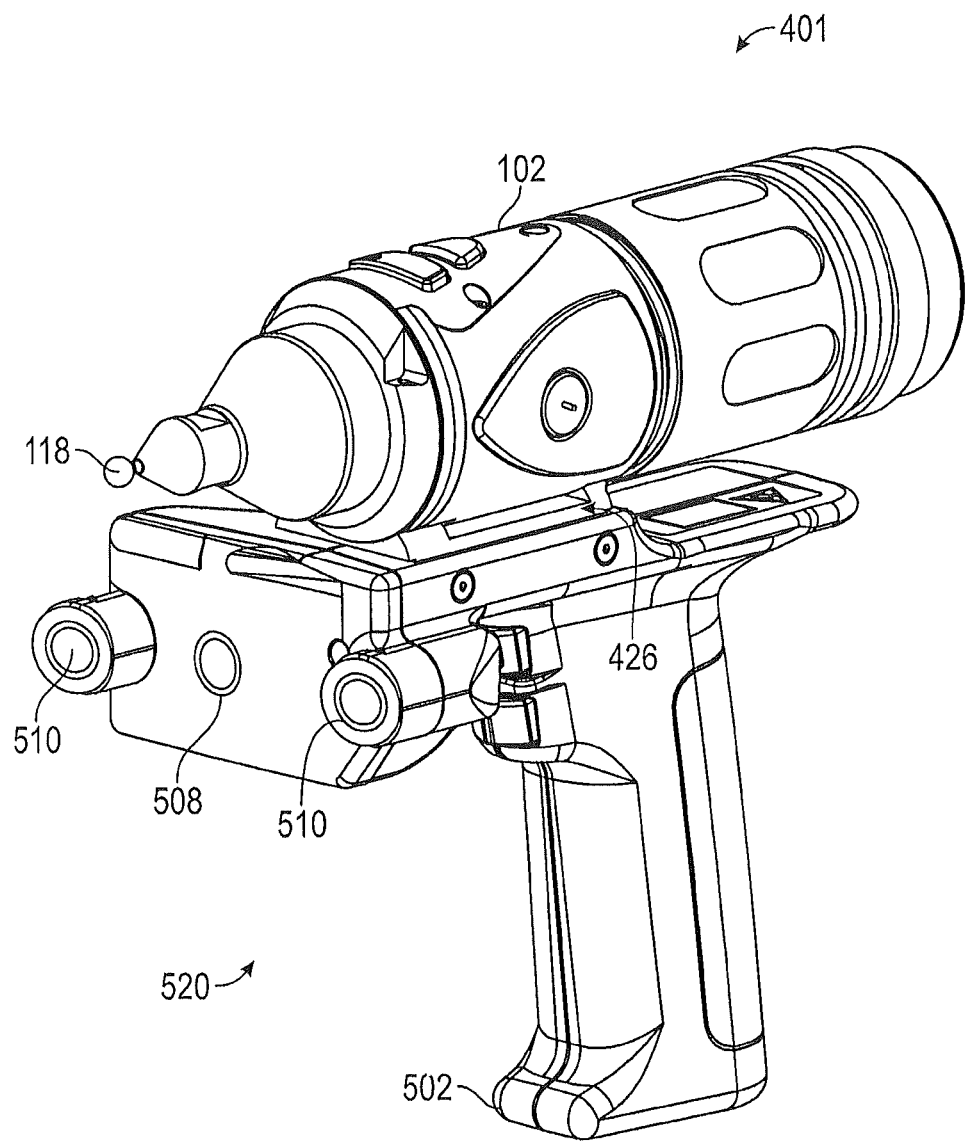
FIG. 12 is an isometric view of the probe end of the AACMM of FIG. 1 with another laser line probe incorporating dual cameras attached.

FIG. 12 shows an embodiment of an LLP 520 that includes a light projector 508 and two cameras 510, the cameras 510 configured to separately image the line projected onto a surface by the projector 508. The redundancy in the images provided by the two cameras 510 may improve measurement accuracy and also provide a way to view regions of an object surface not visible to one of the cameras 510.

Figure 13:
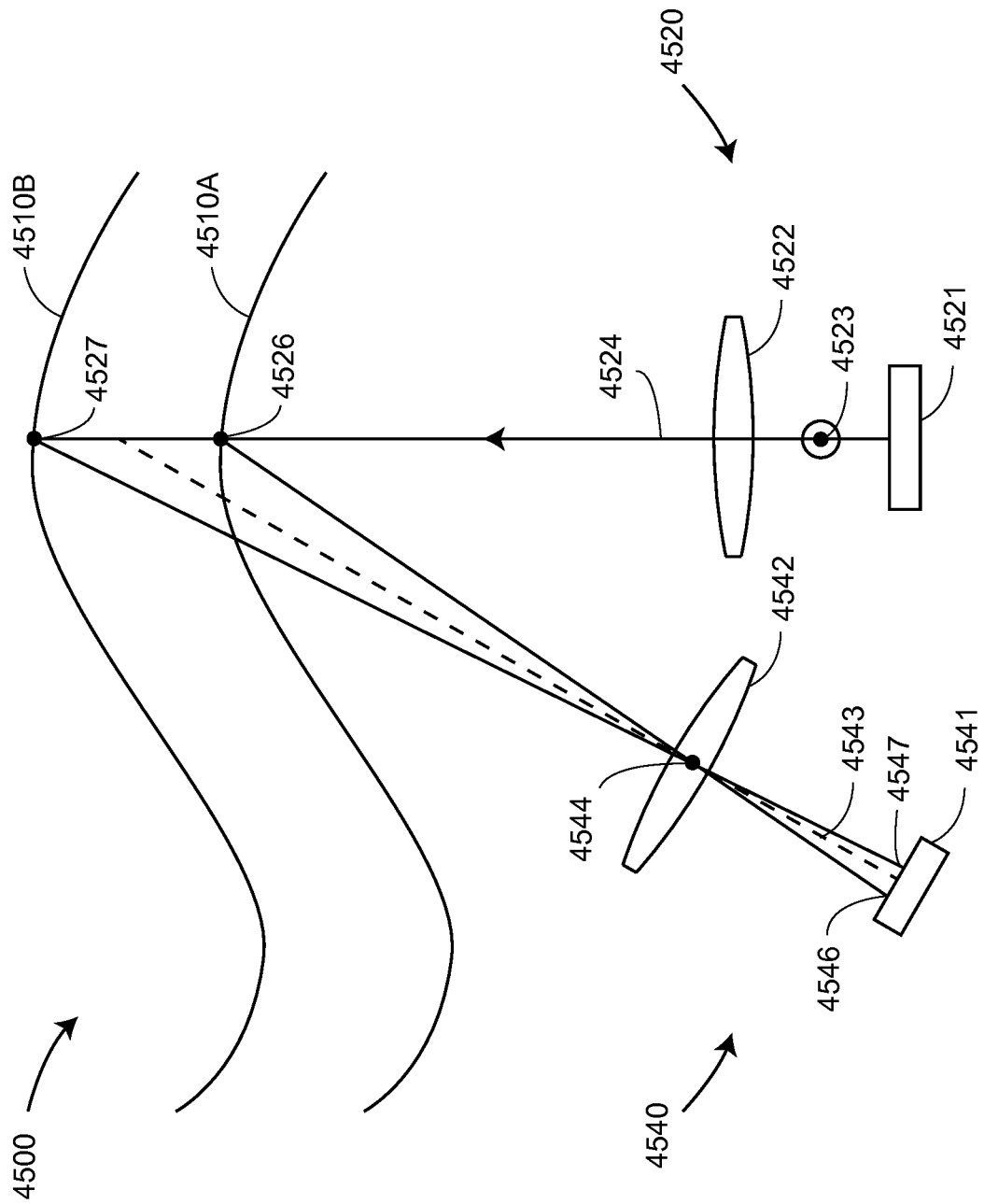
FIG. 13 is a schematic view of elements of a laser line probe (LLP)

FIG. 13 shows elements of an LLP 4500 that includes a projector 4520 and a camera 4540. The projector 4520 includes a source pattern of light 4521 and a projector lens 4522. The source pattern of light includes an illuminated pattern in the form of a line. The projector lens includes a projector perspective center and a projector optical axis that passes through the projector perspective center. In the example of FIG. 13, a central ray of the beam of light 4524 is aligned with the projector optical axis. The camera 4540 includes a camera lens 4542 and a photosensitive array 4541.

The lens has a camera optical axis 4543 that passes through a camera lens perspective center 4544. In the exemplary system 4500, the projector optical axis, which is aligned to the beam of light 4524 and the camera lens optical axis 4544, are perpendicular to the line of light 4523 projected by the source pattern of light 4521. In other words, the line 4523 is in the direction perpendicular to the paper in FIG. 13. The line strikes an object surface, which at a first distance from the projector is object surface 4510A and at a second distance from the projector is object surface 4510B. It is understood that at different heights above or below the plane of the paper of FIG. 13, the object surface may be at a different distance from the projector. The line of light intersects surface 4510A (in the plane of the paper) in a point 4526, and it intersects the surface 4510B (in the plane of the paper) in a point 4527. For the case of the intersection point 4526, a ray of light travels from the point 4526 through the camera lens perspective center 4544 to intersect the photosensitive array 4541 in an image point 4546. For the case of the intersection point 4527, a ray of light travels from the point 4527 through the camera lens perspective center to intersect the photosensitive array 4541 in an image point 4547. By noting the position of the intersection point relative to the position of the camera lens optical axis 4544, the distance from the projector (and camera) to the object surface can be determined using the principles of triangulation. The distance from the projector to other points on the line of light 4526, that is points on the line of light that do not lie in the plane of the paper of FIG. 13, may similarly be found.

In an embodiment, the photosensitive array 4541 is aligned to place either the array rows or columns in the direction of the reflected laser stripe. In this case, the position of a spot of light along one direction of the array provides information needed to determine a distance to the object, as indicated by the difference in the positions of the spots 4546 and 4547 of FIG. 13. The position of the spot of light in the orthogonal direction on the array provides information needed to determine where, along the length of the laser line, the plane of light intersects the object.

In this specification, it is understood that the terms column and row refer simply to a first direction along the photosensitive array and a second direction perpendicular to the first direction. As such, the terms row and column as used herein do not necessarily refer to row and columns according to documentation provided by a manufacturer of the photosensitive array 4541. In the discussion that follows, the rows are taken to be in the plane of the paper on the surface of the photosensitive array. The columns are taken to be on the surface of the photosensitive array and orthogonal to the rows. However, other arrangements are possible.

Figure 14:
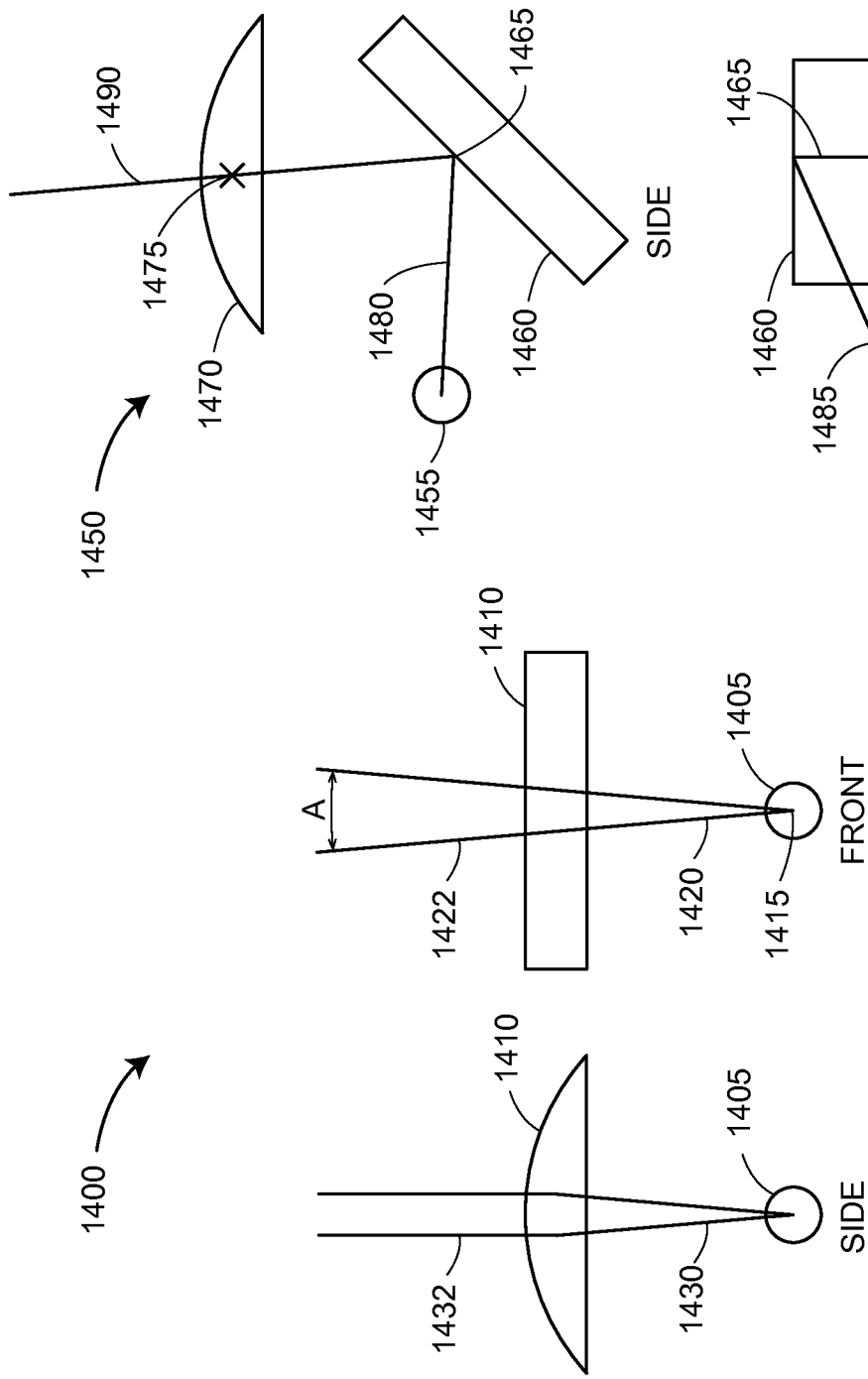
FIG. 14A is a schematic illustration of an apparatus for projecting a line of light using a light source and a lens.
FIG. 14B is a schematic illustration of an apparatus for projecting a line of light using a light source, a microelectromechanical system (MEMS) device, and a lens.

The projector 508 of FIG. 10-12 may be constructed in a variety of ways. Two projector embodiments shown in FIGS. 14A, 14B are now described. These embodiments provide the projector 508 shown in FIGS. 10-12. In a first embodiment of a line projector 1400 illustrated in FIG. 14A, a light source 1405, which might be a laser diode or superluminescent diode, for example, projects light into a cylinder lens 1410. As seen from the side, the cylinder lens is curved on at least on edge. As seen from the front, the cylinder lens has a rectangular profile. The light source 1405 is placed in relation to the lens 1410 so as to collimate the light is the direction seen from the side of the lens. From the front of the lens, the light continues to expand with the initial angle of emission A from the light source 1405. The resulting pattern of light emerging from the projector 1400 is relatively narrow and flat in one direction and relatively wider in the other direction with the light diverging at an angle A as shown in FIG. 14A.

In a second embodiment of the projector 1450 illustrated in FIG. 14B, the light source 1455 projects light onto a microelectromechanical system (MEMS) mirror device 1460. An example of a well known device of this type is the digital light projector (DLP) manufactured in a variety of models by Texas Instruments. A MEMS mirror device includes a collection of small mirror elements and actuators constructed into a semiconductor chip, with the mirror elements capable of electrical activation. By angling the mirror elements in assigned directions, the mirror elements may be adjusted to project the light in a desired direction or to suppress the light. The mirrors may also be moved at a relatively high vibration rate to enable a portion of the light to be projected, thereby changing the optical power projected in a given direction. In this way, a desired pattern, such as a line of laser light, may be projected. The light from the MEMS mirror device passes through a lens 1470, which causes the line of light 1465 to be imaged onto an object under test.

Each of the projectors 1400, 1450 has a perspective center. The perspective center of the projector 1400 is the point 1415, and the perspective center of the projector 1450 is the point 1475. In each case, the perspective center is the point from which rays of light, following correction (also known as compensation), emerge in traveling to the surface being illuminated. In the case of the cylinder lens 1410, to first order the light appears to emerge from the center of the light source 1415. Some correction is needed to account for the refraction of light through the cylinder lens 1410, but this is a small effect. In the case of the MEMS device 1460 and spherical lens 1470, the perspective center is the point from which rays of light, following correction for aberrations, emerge in traveling to the surface being illuminated.

In practice, compensation procedures, often using dot plates, are used to determine compensation parameters for a lens system such as the lens 1470. Compensation parameters provide information on lens aberrations, lens focal length and centering on the array, baseline length and angle of tilt of the camera and projector relative to the baseline. One of the purposes of the compensation parameters is to make it possible to use a simple model in which the lens system has a perspective center 1475. A similar compensation procedure may be used for the cylinder lens 1410 of FIG. 14A. A difference in the systems of FIGS. 14A and 14B is that the system of FIG. 14B has as its objective the imaging of a line of light 1465 onto the surface of an object. In contrast, the cylinder lens 1400 has as its objective the collimation of the light in a first dimension and continued projection of a diverging beam in the orthogonal direction. However, the important thing in either lens 1410 or lens 1470 is that light may be considered to emerge from a single perspective center point.

Because the point 4547 in FIG. 13 is farther from the perspective center 4544 than is the point 4546, the distance from the perspective center to the point 4547 to achieve ideal focusing is smaller than is the distance from the perspective center to the point 4546. To improve the focusing of the light projected onto the object 4510 over a range of distances from the line scanner, the photosensitive array may be tilted to achieve the effect just described, which is to move the point 4547 closer to the perspective center than the point 4546. Tilting the photosensitive array in this way is an example of arranging the camera according to the Scheimpflug principle. Because this principle is well known in the art, it is not discussed further.

FIGS. 15A-D represent images seen on a photosensitive array 1505 such as the array 4541 of FIG. 13. In FIG. 15A, the pattern 1507 seen by a photosensitive array is observed for a particular object surface for the case in which the irradiance (optical power per unit area) into each camera pixel is substantially constant regardless of position along the stripe. In this case, those pixels near the center of the reflected stripe pattern 1507 have pixel wells that are filled with approximately the same number of electrons. When these electrons are converted into a digital signal by an ADC, the digital signal level is approximately the same for each of these pixels.

In another surface having a similar shape but a different reflectance pattern, the shape of the stripe received by the photosensitive array is the same but the number of pixels in the wells varies substantially, as illustrated for the pattern 1527 of FIG. 15B. In this case, the regions 1525A, 1525C, 1525E, and 1525G reflect a relatively large amount of light, which causes the pixels to saturate. In an extreme case, the number of electrons overflows the wells, resulting in an effect known as blooming. In the more general case, saturation refers to a condition in which electrons are not produced in a linear fashion in response to light level applied to the well. In contrast, the regions 1525B, 1525D, and 1525F reflect so little light that the electrons in the well arise to a considerable extent from electrical noise rather than from the incident light. In this low-light region, the electrical response is again not linear with respect to the incident light level. Because of the lack of linearity, the distance to the object surface is not correctly determined for the image obtained by the sensor in FIG. 15B.

Figure 15:
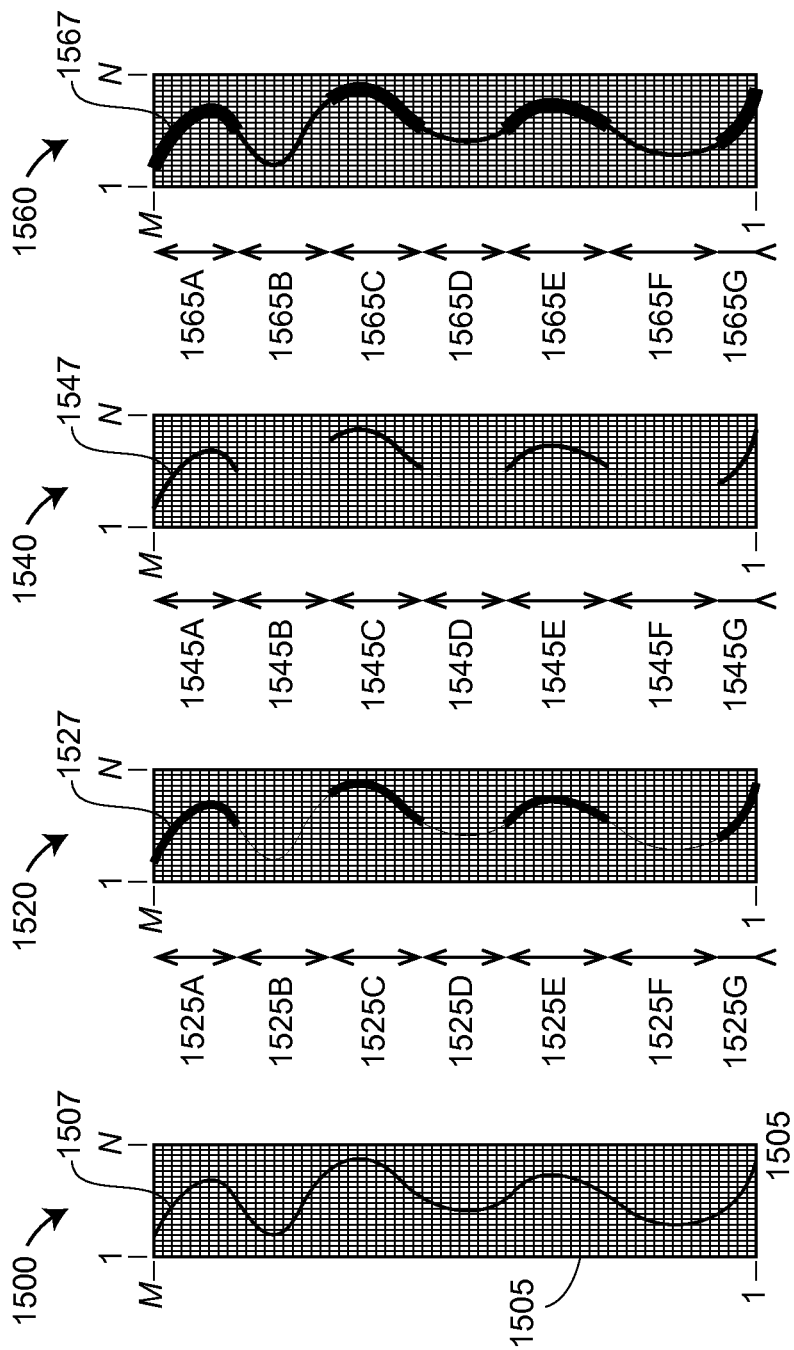
FIGS. 15A-D illustrate patterns of reflected light observed on a photosensitive array according to an embodiment.

To get around this problem, a method according to an embodiment is now described. The line of light is projected multiple times at different optical power levels and those pixels within the linear range of the photosensitive array are then selected. In this way, valid data is obtained for those portions of the object reflecting a relatively large amount of light and those portions reflecting a relatively small amount of light. In the example of FIG. 15, light is projected at a relatively low power level in a first step of FIG. 15C and projected at a relatively high power level in a second step of FIG. 15D. In the first step of FIG. 15C, light in the regions 1545A, 1545C, 1545E, and 1545G is within the linear region of the photosensitive array, thereby producing valid results. The light in the regions 1545B, 1545D, are 1545F is too low in optical power to produce a linear response. Instead, the electrical signal in the pixels of these regions is dominated by electrical noise. In the second step of FIG. 15D, light in the regions 1565B, 1565D, and 1565F is within the linear region of the photosensitive array, thereby producing valid results. The light in the regions 1565A, 1565C, 1565E, and 1565G is too high in optical power and causes saturation. Hence the digital values obtained for the pixels in these regions cannot be trusted. By combining the digital readings obtained from the regions 1545A, 1545C, 1545E, and 1545G with the digital readings obtained from the regions 1565B, 1565D, and 1565F, valid readings may be obtained over the entire array.

In some cases, it may be necessary to use more than two levels of optical power to accurately determine the distance to all points on a surface. Any number of levels may be used. For example, if three levels of optical power are used, they may be referred to as low, medium, and high optical powers.

The level of light reflected from a portion of an object surface depends on the reflectivity of the material for the given wavelength of light (projected onto a flat sample of that material). The reflectance of a given type of material may depend on the texture of the material. For example, if the material is very smooth, it may act as a mirror rather than as a surface that scatters diffusely, as is ordinarily assumed. The reflectance also depends on the angle of incidence of the projected light on the object and on the angle of reflectance of the light reflected to the camera. Very steep surfaces reflect a relatively small amount of light.

When a measurement is first begun, the overall reflectance of an object surface may not be known, with the result that the initial optical power is selected as being too low or too high. The initial optical power selected for a sequential projection of optical powers may be adjusted according to the observed response of the photosensitive array.

The discussion hereinabove assumes that the optical power is adjusted to change the number of electrons within the pixel wells. However, it is equally possible to adjust the exposure duration (integration time) instead of the optical power. A way to include the combined effects of the optical power and integration time is through the use of an integrated energy. We can speak of the integrated energy of a line of light as the integral of the optical power (units of Watts, for example) of the line of light over a specified integration time (units of seconds) to obtain an integrated energy (units of Joules, for example) for the line. If either the optical power of the line of light or the integration time of the pixels changes (for a particular geometrical arrangement of the line scanner relative to the object surface), the pixel wells will fill up more or less in response.

We can also speak of an optical energy for each of the pixels in the array. The optical energy for a pixel equals the integral of the optical power incident on the pixel over the integration time of the pixel. If the integrated energy of a line of light changes, the optical energy of each of the pixels in the array changes by a proportional amount for a pixel operating within the linear range. For example, for FIG. 15C, the integrated energy of the line of light is less than for FIG. 15D, and the pixels of FIGS. 15C-D (that are within the linear range) respond in proportion to the integrated energy.

Figure 16:
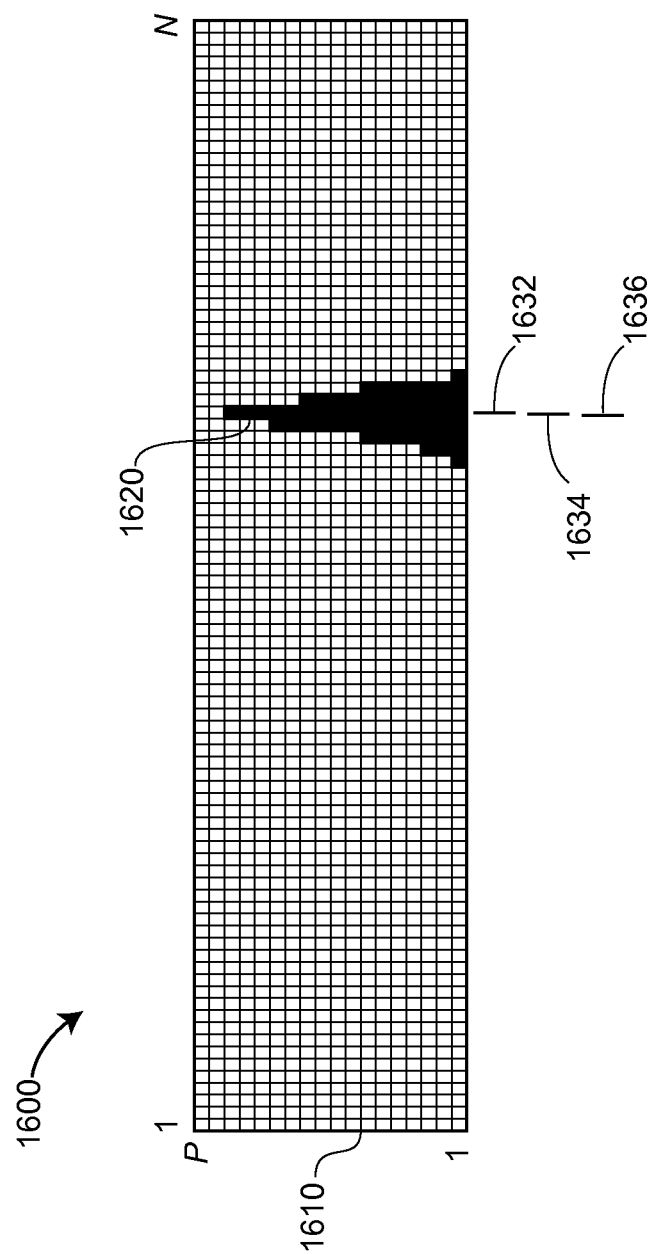
FIG. 16 illustrates a method of determining a center value for a row of a photosensitive array according to an embodiment.

As explained hereinabove, a triangulation calculation is performed to determine the distance from the scanner to a surface point. This is done by matching a point on the projected line 4523 (FIG. 13) to a corresponding point on the photosensitive array. To make this correspondence, it is necessary to determine a center value for the laser stripe at each position along the stripe length. For example, as shown in FIG. 16, one of the rows 1610 in an array may produce a pattern of digital values 1620. The values 1 to P are those values obtained from an ADC. For example, for a 10 bit ADC, the value of P is $2^{10}=1024$. In correspondence to the illustration of FIG. 15, the array 1610 is taken to have N columns. The center of the pattern of digital values may be determined by a number of different methods. For example, a simple method is to select the column number of the pixel having the largest digital value. This value, which in the example of FIG. 16, is equal to 60, and is indicated by the marker 1632. Another method is to take the centroid of the digital values, which in this case is 59.7966, indicated by the marker 1636. A third method is to fit the digital values to a Gaussian curve, which is a curve having a formula $\exp(-(-x-x0)2/w2)$, where exp is the exponential function, x is a column position, x0 is the center value, and w is a width of the Gaussian curve. In this case, the center value is equal to 59.8697 as indicated by the marker 1634. Many other methods are possible for determining a center value.

In an embodiment, two or more images—for example, the images of FIGS. 15C and 15D—are captured with a photosensitive array and converted into digital values with an ADC. The digital values are processed to provide accurate 3D coordinates over a larger portion of the object surface than might otherwise be possible. In an embodiment illustrated in FIG. 17, a plurality of images are processed to obtain summary data. For image1 of FIG. 17A and image 2 of FIG. 17B, a maximum value is found for each row of the image. The rows in FIGS. 17A, 17B each range from 1 to M. Each of these rows includes N columns (as indicated in FIGS. 15 and 16), and the maximum of the digital values within these columns is selected for each row. The maximum values for each of the rows is put into a cell of an array 1710 of FIG. 17A and a cell 1730 of FIG. 17B. For those rows of 1710, 1730 for which the maximum value is within a preferred range of values for which the response is considered to be approximately linear rather than saturated or dominated by electrical noise, a calculation is made of the center value of the cell according to a method described with respect to FIG. 16 or any other method. This calculated value is placed in a cell of the array 1715, 1735. If the maximum value of a row is not within the preferred range, then no calculation is performed and the corresponding cell of 1715, 1735 identified in some way—for example, by leaving the cell blank or by entering a negative value into the cell.

The values in the cells of 1715, 1735 are used to determine composite values for the rows of a composite array 1765 of FIG. 17C. If both cells of 1715, 1735 for a given row are occupied with a value, these values may be combined in a variety of ways to obtain a single composite value for the corresponding cell of FIG. 17C. For example, the maximum of the two values may be selected. As another example, the two values may be weighted according to a weighting scale depending on a specified way on the maximum values of the corresponding cells of 1710, 1730. If only one of the cells of 1715, 1735 is occupied with a value, then that value is the corresponding composite value. If neither of the cells of 1715, 1735 is occupied with a value, then the cell of 1770 of FIG. 17C may left blank, filled with a negative number, or marked in some other way.

The example given for FIG. 17 is for the case of two images (image 1 and image 2) but as indicated by the ellipsis following image 2, more images may be included in determining the composite array of FIG. 17C.

The distance from the line scanner to a point on an object surface may be found from the values in the composite array. As may be seen from FIG. 13, a change in distance from the scanner to the surface corresponds to a shift in the column position at which the illuminated surface point is imaged on the photosensitive array 4541. Furthermore each row position on the photosensitive array 4541 corresponds to a particular position on the line of light that 4523 at the position the line illuminates the surface. Because rays of light pass through the camera perspective center 4544, the row positions tend to move nearer the row center of the photosensitive array 4541 as the distance from the line scanner to the object increases. By observing both the row and column positions of the stripe on the photosensitive array 4541, the 3D coordinates of the illuminated points are determined within the scanner frame of reference (i.e., within the scanner coordinate system).

The determination of the 3D coordinates is based on a triangulation calculation. To carry out this calculation, it is necessary to known the baseline distance, which is the distance between the camera perspective center and the projector perspective center. It is also necessary to know the relative orientation of the camera and projector. The method of performing a triangulation calculation is well known in the art and is not discussed further here.

In some cases, diagnostic procedures may indicate that a particular value within a cell is invalid. For example, the general distribution of light within a row may indicate an abnormality in the reflected light pattern that requires further investigation. An analysis of reflected patterns of light based on the observed shape of the measured object may indicate that multipath interference is present in which light arrives at a point on the object under test, not only from the projector, but also from a secondary reflection from the object itself. For a case in which a diagnostic procedure indicates that a point is not (or may not be) valid, an additional step may be to remove the composite center value from the corresponding cell in array 1770 of FIG. 17C.

Figure 18:
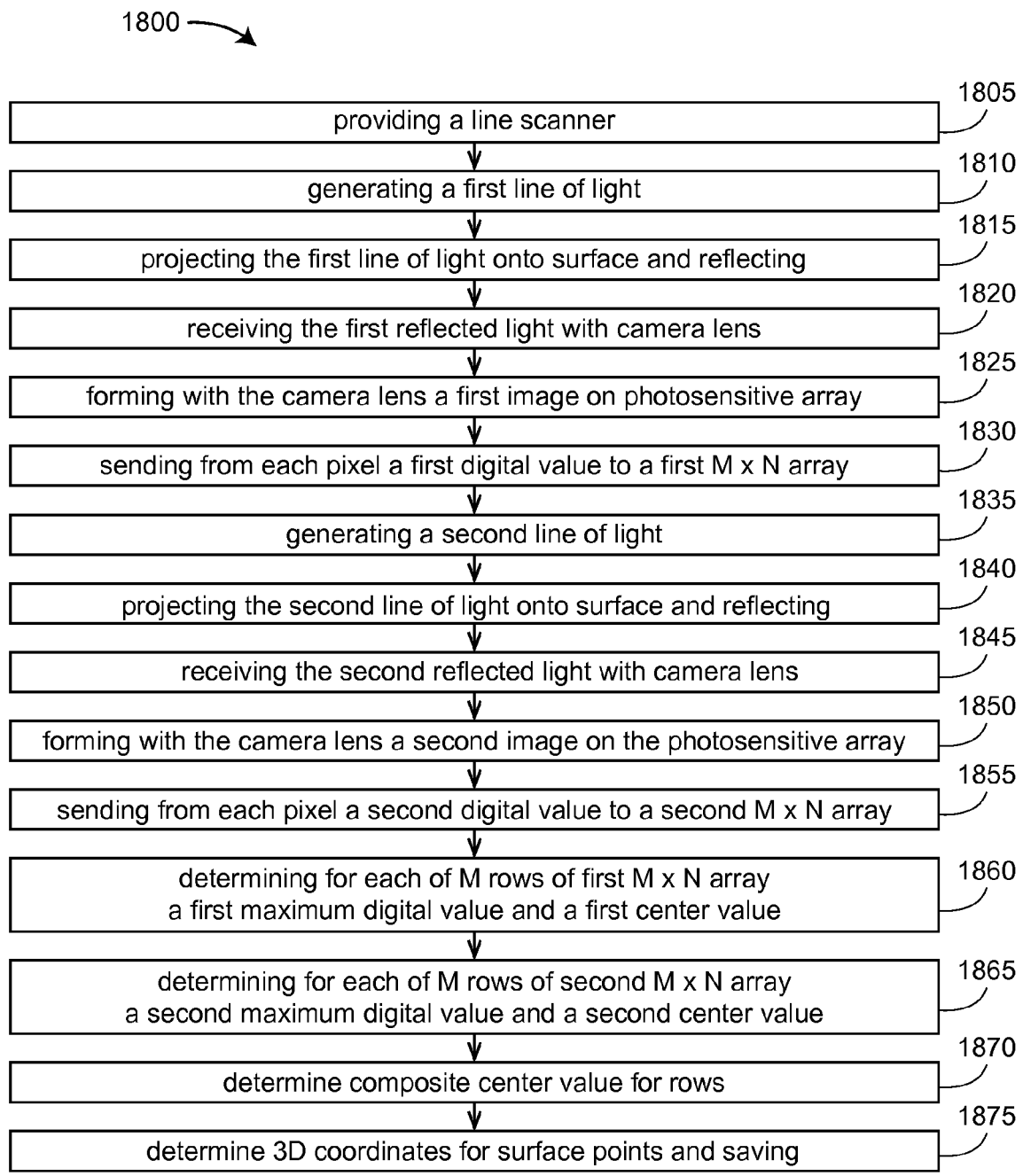
FIG. 18 describes a method for obtaining three-dimensional coordinates of a surface according to an embodiment according to an embodiment.

FIG. 18 describes steps of a method 1800 for measuring 3D coordinates of an object surface using a line scanner according to an embodiment. A step 1805 is providing a line scanner that includes a processor, a projector and a camera, the line scanning having a first frame of reference, the projector including a light source and a projector lens, the projector being configured to emit a line of light substantially straight when projected onto a plane perpendicular to a direction of propagation of the light, the projector having a projector perspective center, the camera including a photosensitive array and a camera lens, the camera having a camera perspective center, the camera lens being configured to form an image of a portion of the surface on the photosensitive array, the photosensitive array including an array of pixels, the array having M rows and N columns, where M and N are integers, each of the pixels in the array of pixels configured to convert an optical energy captured by each of the pixels into an electrical value corresponding to a digital value, the processor configured to receive the digital values, the line scanner having a baseline, the baseline being a straight line segment between the projector perspective center and the camera perspective center, the projector having a projector orientation with respect to the baseline, the camera having a camera orientation with respect to the baseline, the processor configured to control the light source and to receive the digital electrical signals from the photosensitive array. Aspects of this providing step have been discussed with respect to FIGS. 10-17 and the text hereinabove.

A step 1810 is generating a first line of light at a first time, the first line of light having a first optical power. A step 1815 is projecting the first line of light onto the surface and reflecting the first line of light as a first reflected light from the surface. The step 1820 is receiving the first reflected light with the camera lens. The step 1825 is forming with the camera lens a second image of the second reflected light on the photosensitive array over a second integration time and generating in response a second optical energy for each of the pixels, the second optical energy for each of the pixels depending at least in part on a second integrated energy, the second integrated energy equal to an integral of the second optical power over the second integration time, wherein the second integrated energy is different than the first integrated energy. The step 1830 is sending for each of the pixels a first digital value to the processor to obtain a first M×N array of first digital values. The steps 1835 to 1855 are the same as the steps 1810 to 1830 except that the word "second" replaces the word "first."

The step 1860 is determining with the processor for each of the M rows of the first M×N array a first maximum digital value and a first center value, the first maximum digital value for the row equal to a maximum of the N first digital values of the row, the first center value based at least in part on at least one of the N first digital values of the row. The step 1865 is the same as the step 1860 except that the word "second" replaces the word "first."

The step 1870 is determining with the processor a composite center value for each row in which a first condition or a second condition is met, the first condition being that the first maximum digital value is less than a saturation level and exceeds a noise level, the second condition being that the second maximum digital value is less than the saturation level and exceeds the noise level, the composite center value based at least in part on the first center value and the second center value. The step 1875 is calculating with the processor for each of the M rows having a composite center value three-dimensional coordinates of a point on the surface, the three-dimensional coordinates calculated in the first frame of reference, the three-dimensional coordinates based at least in part on the composite center value, a length of the baseline, the projector orientation, and the camera orientation, and storing the three-dimensional coordinates for each of the M rows having a composite center value. All of the steps 1805-1875 are further explained by figures and text included hereinabove.

To determine points over an area of an object surface, the scanner may be moved over the surface. If the scanner is attached to an articulated arm CMM as in FIG. 10 then the arm may provide information about the position and orientation of the line scanner each time a scanner measurement is made. By performing a matrix transformation using methods that are well known in the art, the 3D coordinates of the object surface may be transformed from the scanner frame of reference to the frame of reference of the articulated arm CMM. Similar transformations may be used to obtain the coordinates of the scanned surface in any arbitrary frame of reference.

Figure 19:
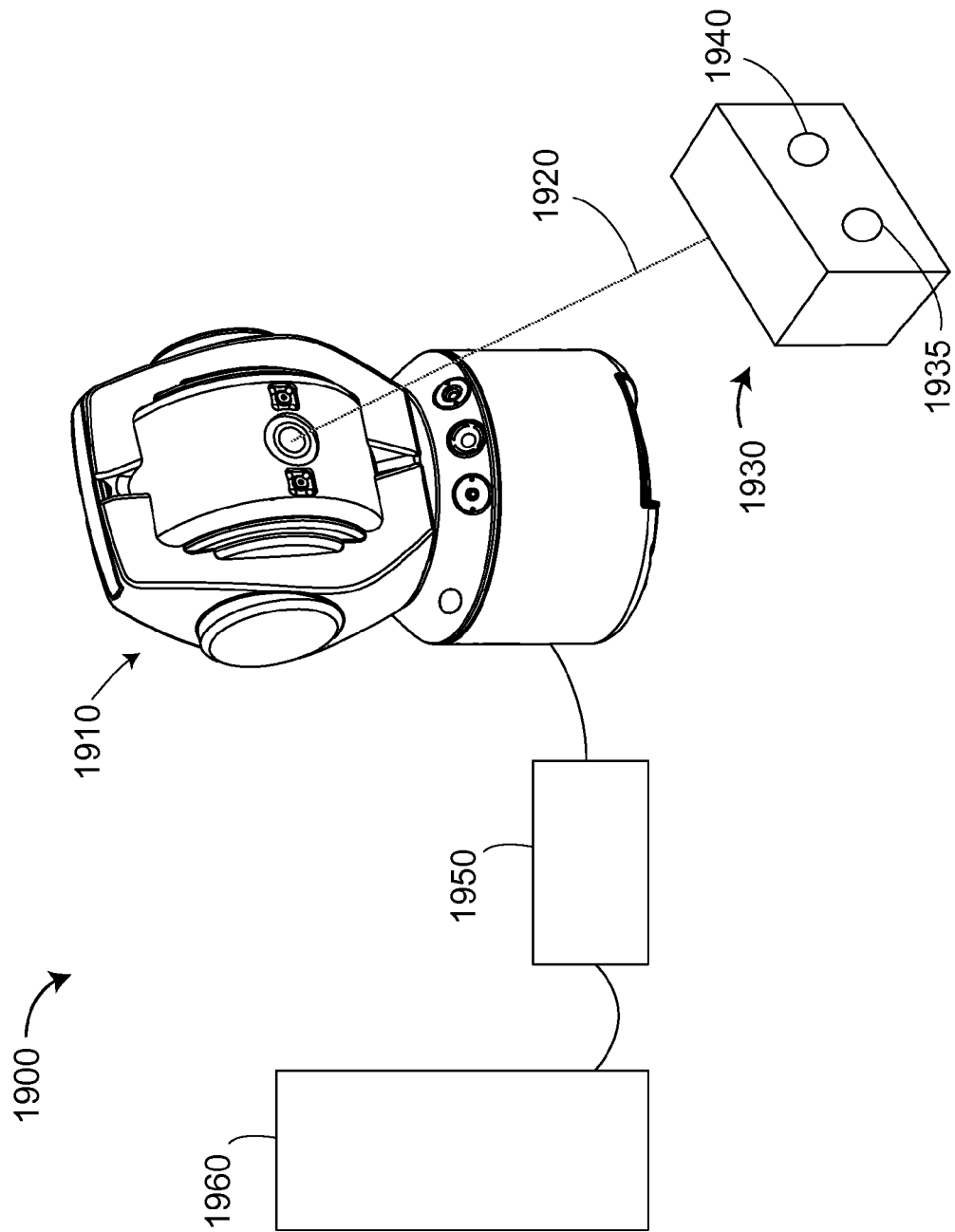
FIG. 19 is a perspective view of a six-DOF laser tracker used to located a line scanner 1930 according to an embodiment.

The line scanner may be used in conjunction with a six degree-of-freedom (6 DOF) laser tracker, as shown in FIG. 19. A line scanner 1930 includes a projector 1935 and a camera 1940. A line from the laser tracker 1910 is sent to a retroreflector attached to the line scanner 1930. In the perspective drawing of FIG. 19, the retroreflector is at the rear of the line scanner 1930 and is hidden from view. An ordinary laser tracker measures three position degrees of freedom—for example, one distance and two angles in a spherical coordinate system. A 6 DOF laser tracker measures in addition the three orientation angles of the line scanner, thereby enabling the 3D coordinates of the object surface measured by the scanner to be transformed into the tracker frame of reference. Laser trackers capable of measuring 6 DOF are well known in the art and are not discussed further. The overall system may optionally include an accessory power supply/processor box 1950 and an external computer 1960.

The line scanner may be used in conjunction with two or more cameras separated by a known distance, as shown in the system 2000 of FIG. 20. A camera bar 2010 includes a rigid bar to which cameras 2020 and 2024 are mounted to provide a stereo view of illuminated points 2044 on a line scanner device 2040. An optional camera 2022 may be used to provide color information or to provide additional camera measurements to improve 3D measurement accuracy. A processor 2050 may be used to process digital image data provided by the cameras to determine 3D coordinates of the surface 2060. The line scanner includes a projector 2052 that projects a line of light 2066 onto the object and a camera 2054 that images the line of light onto a photosensitive array within the camera.

A line scanner used according to the inventive idea taught above may be included in a fixed position in a production line with parts to be inspected moved on a conveyor belt beneath the scanner.

A line scanner may untethered and moved by hand over an object surface to be inspected. In this case, registration of multiple successive images may be obtained in a variety of ways. Natural features may be used to register the multiple images. Registration spots either on the object or off the object may be provided by illuminated lights (for example, LEDs) or by reflective spots onto which light is flashed. Inertial measurement devices such as accelerometers, gyroscopes, magnetometers, GPS units, and altimeters may be further used to assist in monitoring scanner position and orientation.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for measuring three-dimensional coordinates of a surface of an object, the method comprising:

providing a line scanner that includes a processor, a projector and a camera, the line scanning having a first frame of reference, the projector including a light source and a projector lens, the light source being configured to emit a line of light substantially straight when projected onto a plane perpendicular to a direction of propagation of the line of light, the projector having a projector perspective center, the camera including a photosensitive array and a camera lens, the camera having a camera perspective center, the camera lens being configured to form an image of a portion of the surface on the photosensitive array, the photosensitive array including an array of pixels, the array of pixels having M rows and N columns, where M and N are integers, each of the pixels in the array of pixels configured to convert an optical energy captured by each of the pixels into an electrical value corresponding to a digital value, the processor configured to receive the digital values, the line scanner having a baseline, the baseline being a straight line segment between the projector perspective center and the camera perspective center, the projector having a projector orientation with respect to the baseline, the camera having a camera orientation with respect to the baseline, the processor configured to control the light source and to receive the digital values;

generating a first line of light at a first time, the first line of light having a first optical power;

projecting the first line of light onto the surface;

reflecting the first line of light as a first reflected light from the surface;

receiving the first reflected light with the camera lens;

forming with the camera lens a first image of the first reflected light on the photosensitive array over a first integration time and generating in response a first optical energy for each of the pixels, the first optical energy for each of the pixels depending at least in part on a first integrated energy, the first integrated energy equal to an integral of the first optical power over the first integration time;

sending for each of the pixels a first digital value to the processor to obtain a first M×N array of first digital values;

generating a second line of light at a second time, the second line of light having a second optical power;

projecting the second line of light onto the surface;

reflecting the second line of light as a second reflected light from the surface;

receiving the second reflected light with the camera lens;

forming with the camera lens a second image of the second reflected light on the photosensitive array over a second integration time and generating in response a second optical energy for each of the pixels, the second optical energy for each of the pixels depending at least in part on a second integrated energy, the second integrated energy equal to an integral of the second optical power over the second integration time, wherein the second integrated energy is different than the first integrated energy;

sending for each of the pixels a second digital value to the processor to obtain a second M×N array of second digital values;

determining with the processor for each of the M rows of the first M×N array of first digital values a first maximum digital value and a first center value, the first maximum digital value for the row equal to a maximum of the N first digital values of the row, the first center value based at least in part on at least one of the N first digital values of the row;

determining with the processor for each of the M rows of the second M×N array of second digital values a second maximum digital value and a second center value, the second maximum digital value for the row equal to a maximum of the N second digital values of the row, the second center value based at least in part on at least one of the N second digital values of the row;

determining with the processor a composite center value for each of the M rows in which a first condition or a second condition is met, the first condition being that the first maximum digital value is less than a saturation level and exceeds a noise level, the second condition being that the second maximum digital value is less than the saturation level and exceeds the noise level, the composite center value based at least in part on the first center value and the second center value;

calculating with the processor for each of the M rows having a composite center value three-dimensional coordinates of a point on the surface, the three-dimensional coordinates calculated in the first frame of reference, the three-dimensional coordinates based at least in part on the composite center value, a length of the baseline, the projector orientation, and the camera orientation; and storing the three-dimensional coordinates for each of the M rows having a composite center value.

2. The method of claim 1 wherein in the steps of generating a first line of light at a first time and generating a second line of light at a second time, the first optical power is different than the second optical power.

3. The method of claim 1 wherein in the steps of forming with the camera lens a first image and forming with the camera lens a second image, the first integration time is different than the second integration time.

4. The method of claim 1 wherein in the steps of generating a first line of light and of forming with the camera lens a first image, the first optical power is constant over the first integration time.

5. The method of claim 1 wherein, in steps of generating a second line of light at a second time and forming with the camera lens a second image, at least one of the second optical power and the second integration time is based at least in part on the M first maximum digital values.

6. The method of claim 1 wherein, in the step of providing a line scanner, the light source is a laser diode or a superluminescent diode and the projector lens is a cylinder lens or a Powell lens.

7. The method of claim 1 wherein, in the step of providing a line scanner, the projector further includes a microelectromechanical systems (MEMS) element.

8. The method of claim 1 wherein the line of light is substantially perpendicular to the baseline.

9. The method of claim 1 further including a step of calculating for each of the three-dimensional coordinates in the first frame of reference three-dimensional coordinates in a second frame of reference.

10. The method of claim 9 further including a step of attaching the line scanner to an end of an articulated arm CMM, the articulated arm CMM being in the second frame of reference, the articulated arm CMM determining a position and an orientation of the line scanner in the second frame of reference.

11. The method of claim 9 further including a step of measuring a position and an orientation of the line scanner with a laser tracker, the laser tracker being in the second frame of reference.

12. The method of claim 9 further including a step of measuring a position and orientation of the line scanner with two cameras, the two cameras having a separation distance, the two cameras being in the second frame of reference.

13. The method of claim 1 wherein in the step of determining with the processor for each of the M rows of the first M×N array a first maximum digital value and a first center value, the first center value is further based at least in part on a centroid of the first digital values of the row.

14. The method of claim 13 wherein the centroid is calculated to sub-pixel resolution.

15. The method of claim 1 wherein in the step of determining with the processor for each of the M rows of the first M×N array a first maximum digital value and a first center value, the first center value is further based at least in part on a value obtained using curve fitting.

16. The method of claim 15 wherein the curve fitting is a fitting to a Gaussian shape.

17. The method of claim 1 wherein in the step of determining with the processor a composite center value, the composite center value is selected as the first center value if the first maximum digital value exceeds the second maximum digital value and is selected as the second center value if the second maximum digital value exceeds the first maximum digital value.

18. The method of claim 1 wherein in the step of determining with the processor a composite center value, the composite center value is selected as a weighted average of the first center value and the second center value, wherein the weighting is based on relative magnitudes of the first maximum digital value and the second maximum digital value.

* * * * *